(12) United States Patent
Gaudin

(10) Patent No.: US 10,335,988 B2
(45) Date of Patent: Jul. 2, 2019

(54) INJECTION MOLD WITH A TRANSFER LOADER AND ASSOCIATED INJECTION METHOD

(71) Applicant: JP GROSFILLEY, Martignat (FR)

(72) Inventor: Philippe Gaudin, Groissiat (FR)

(73) Assignee: JP GROSFILLEY, Martignat (FR)

( * ) Notice: Subject to any disclaimer, the term of this patent is extended or adjusted under 35 U.S.C. 154(b) by 207 days.

(21) Appl. No.: 15/283,955

(22) Filed: Oct. 3, 2016

(65) Prior Publication Data
US 2017/0095959 A1 Apr. 6, 2017

(30) Foreign Application Priority Data

Oct. 2, 2015 (FR) ...................... 15 59395

(51) Int. Cl.
*B29C 45/16* (2006.01)
*B29C 45/26* (2006.01)
*B29C 45/00* (2006.01)
*B29C 45/40* (2006.01)

(52) U.S. Cl.
CPC ...... *B29C 45/2681* (2013.01); *B29C 45/0003* (2013.01); *B29C 45/006* (2013.01); *B29C 45/162* (2013.01); *B29C 45/40* (2013.01); *B29C 2045/0063* (2013.01)

(58) Field of Classification Search
CPC .............. B29C 45/0003; B29C 45/006; B29C 2045/0063; B29C 45/162
See application file for complete search history.

(56) References Cited

U.S. PATENT DOCUMENTS

| 5,256,048 A * | 10/1993 | Jacobs | A46D 3/00 264/243 |
| 5,769,506 A * | 6/1998 | Boucherie | A46D 3/00 300/2 |
| 2006/0051452 A1* | 3/2006 | Woller | B29C 45/045 425/556 |

FOREIGN PATENT DOCUMENTS

DE   4213654 A1 * 10/1993  ......... B29C 45/1756
EP   1 060 868 A1   12/2000

* cited by examiner

*Primary Examiner* — Robert B Davis
(74) *Attorney, Agent, or Firm* — Oliff PLC

(57) ABSTRACT

An injection mold including at least one first station for the injection of a first portion of the part, at least one second station for the injection of a second portion of the part, a first loader including at least one first molding cavity, the first loader being movable at least in rotation between the first injection station and a first transfer and/or assembly area, a second loader including at least one first molding cavity, the second loader being movable at least in rotation between the second injection station and a second transfer and/or assembly area, wherein the injection mold includes at least one transfer loader, movable at least in rotation between the first transfer and/or assembly area and the second transfer and/or assembly area.

10 Claims, 7 Drawing Sheets

Figure 1:
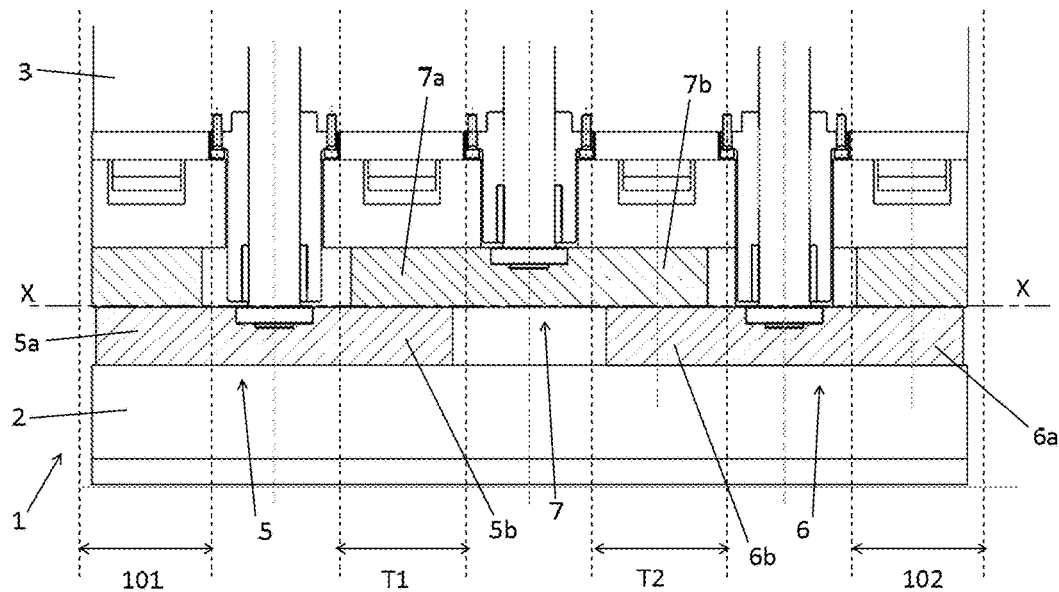

Fig. 5
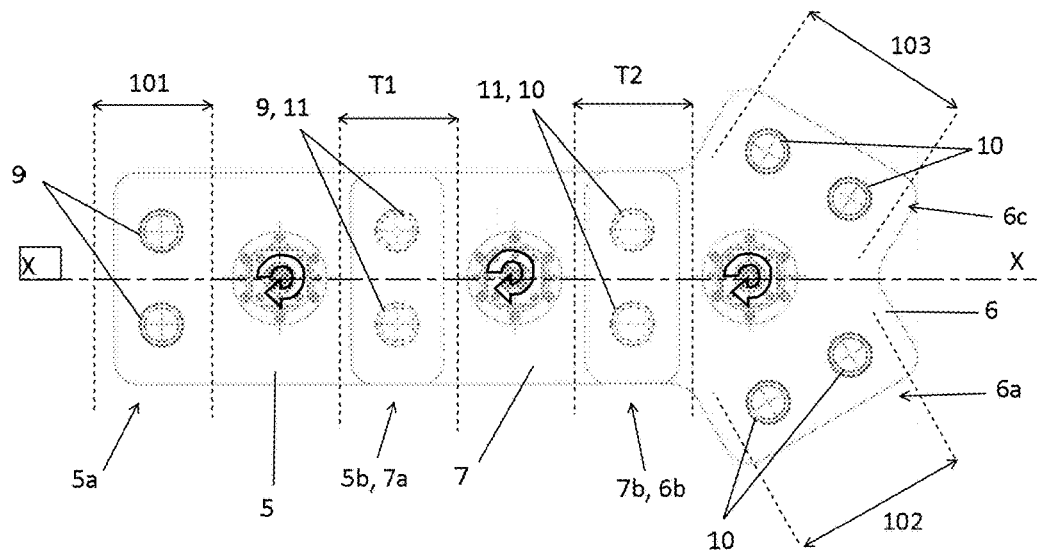
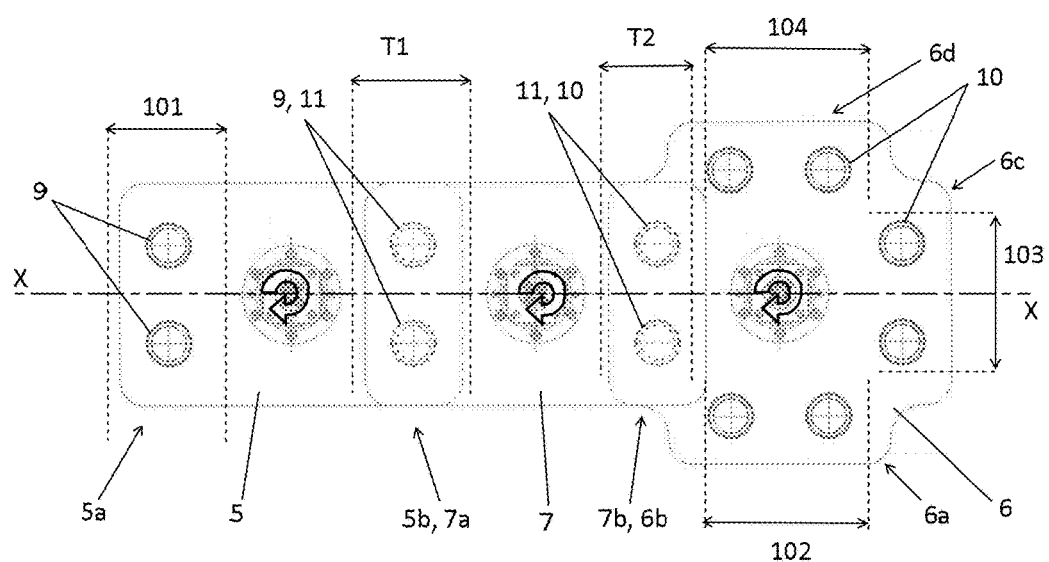
Fig. 6

INJECTION MOLD WITH A TRANSFER LOADER AND ASSOCIATED INJECTION METHOD

The present invention concerns the field of plastic injection molds and more particularly the rotary plastic injection molds.

Conventionally, the more the plastic parts are complex (bi-material, inserts, complexity in the shape) to realize, the more is the number of successive injection operations.

Thus, in general, a preform is realized by injection in a first mold, said preform being transferred afterwards by means of a robot in a second mold for a second injection and so on until the formation of the completed part. This method is tedious and prolongs the duration of the production cycle.

Moreover, the use of a robot for transferring the parts is onerous and requires a workforce and maintenance different from those required for injection molds.

Furthermore, when a preform is transferred from one mold to another, the settlement of the preforms is altered and accuracy is lost.

The invention aims to remedy to all or part of the aforementioned drawbacks.

An object of the invention is an injection mold comprising:
- at least one first station for the injection of a first portion of the part,
- at least one second station for the injection of a second portion of the part,
- a first loader including at least one first molding cavity, said first loader being movable at least in rotation between the first station and a first transfer and/or assembly area,
- a second loader including at least one first molding cavity, said second loader being movable at least in rotation between the second station and a second transfer and/or assembly area,
- characterized in that the injection mold comprises at least one transfer loader, movable at least in rotation between the first transfer and/or assembly area and the second transfer and/or assembly area, said transfer loader being configured to transfer the first portion of the part from the first loader on the second loader and/or said transfer loader being configured to transfer the second portion of the part from the second loader on the first loader.

Thanks to the invention, the transfer from one injection station to another is carried out within the same injection mold, which avoids the transfers of a part in an open mold, thereby allowing a gain of time and accuracy in the formation of the part, and simplifying maintenance and avoiding misadjustments.

According to one feature of the invention, the transfer loader comprises at least one first transfer cavity shaped so as to pair in the first transfer and/or assembly area with the at least one molding cavity of the first loader so as to transfer the first portion of the part from the first loader on the transfer loader or vice versa.

According to another feature of the invention, the at least one transfer cavity of the transfer loader is shaped so as to pair in the second transfer and/or assembly area with the at least one molding cavity of the second loader so as to transfer the second portion of the part from the transfer loader on the second loader or vice versa.

According to one feature of the invention, the first loader comprises a plurality of molding cavities.

According to one feature of the invention, the second loader comprises a plurality of molding cavities, which allows molding several parts at the same time.

According to one feature of the invention, the transfer loader comprises a plurality of transfer cavities.

According to one feature of the invention, the injection mold comprises at least one third loader.

According to one feature of the invention, the injection mold comprises at least one cooling station and/or at least one heating station and/or at least one insert posing station and/or at least one snap-fitting station and/or at least one mirror welding station and/or at least one overmolded-bead welding station and/or at least one ornament posing station and/or at least one laser marking station.

According to one feature of the invention, the first loader is preferably movable in translation.

According to one feature of the invention, the second loader is preferably movable in translation.

Preferably, the transfer loader is configured to be displaced in rotation and in translation.

Advantageously, the translational displacement of the first and second loaders and of the transfer loader enables the disengagement of the loaders from each other in order to enable their rotation.

According to one feature of the invention, the axis of rotation of the first loader, the axis of rotation of the second loader and the axis of rotation of the transfer loader are aligned.

Alternatively, the axis of rotation of the first loader is positioned at an angle with respect to the axis of rotation of the second loader. More particularly, the axes of rotation and translation of the first loader and of the transfer loader are aligned along the longitudinal axis X-X of the injection mold or along an axis parallel to the longitudinal axis X-X, and the axes of rotation and translation of the second loader 6 and of the transfer loader are aligned along an axis Y-Y secant to the longitudinal axis X-X of the injection mold.

According to one feature of the invention, the injection mold comprises a first mold portion and a second mold portion opposite to the first mold portion, the first loader, the second loader and the transfer loader being arranged between the first and second mold portions, and preferably the transfer loader being positioned between the first loader and the second loader.

According to one feature of the invention, the transfer loader is positioned between the first loader and the second loader.

According to one feature of the invention, and in a first positioning configuration of the first loader, of the second loader and of the transfer loader, the transfer loader is arranged below the first and second loaders. More particularly and according to one feature of the invention, the transfer loader is arranged the closest to the first mold portion in comparison with the first and second loaders.

Thus, according to one feature of the invention, the transfer loader is arranged set back with respect to the longitudinal axis X-X of the injection mold and with respect to the first loader and to the second loader, in the direction of the first mold portion of the injection mold.

Alternatively, and according to one feature of the invention, the first loader is positioned set back with respect to the longitudinal axis X-X of the injection mold in the direction of the second mold portion of the injection mold and the second loader is positioned set back with respect to the longitudinal axis X-X of the injection mold in the direction of the first mold portion of the injection mold.

Alternatively and according to one feature of the invention, the transfer loader is arranged set back with respect to the longitudinal axis X-X of the injection mold and with respect to the first loader and to the second loader, in the direction of the second mold portion of the injection mold.

The invention also relates to an injection method implemented by an injection mold according to the invention, said injection method comprising at least the following steps:
injection of a first portion of the part in a molding cavity of a first portion of the first loader at a first station,
injection of a second portion of the part in a molding cavity of a first portion of the second loader at a second station,
rotation of the first loader so that the first portion of the first loader, carrying the injected first portion of the part, is positioned at the level of the first transfer and/or assembly area,
rotation of the second loader so that the first portion of the second loader, carrying the injected second portion of the part, is positioned at the level of the second transfer and/or assembly area,
transfer of the first portion of the part in a transfer cavity at the level of the first transfer and/or assembly area or transfer of the second portion of the part in a transfer cavity at the level of the second transfer and/or assembly area,
rotation of the transfer loader so that the transfer cavity in which is positioned the first portion of the part faces, at the level of the second transfer and/or assembly area, the molding cavity of the first portion of the second loader in which is positioned the second portion of the part, or so that the transfer cavity in which is positioned the second portion of the part faces, at the level of the first transfer and/or assembly area, the molding cavity of the first portion of the first loader in which is positioned the first portion of the part,
assembly of the first portion of the part with the second portion of the part,
ejection of the completed part resulting from the assembly of the first portion of the part with the second portion of the part.

According to one feature of the invention, the steps of injection of the first portion of the part and of the second portion of the part are carried out simultaneously and/or the steps of rotation of the first and second loaders are carried out simultaneously.

According to one feature of the invention, the injection method comprises an additional step of injecting a third portion of the part and an additional step of assembling the third portion of the part with the first portion of the part or with the second portion of the part.

Figure 2:
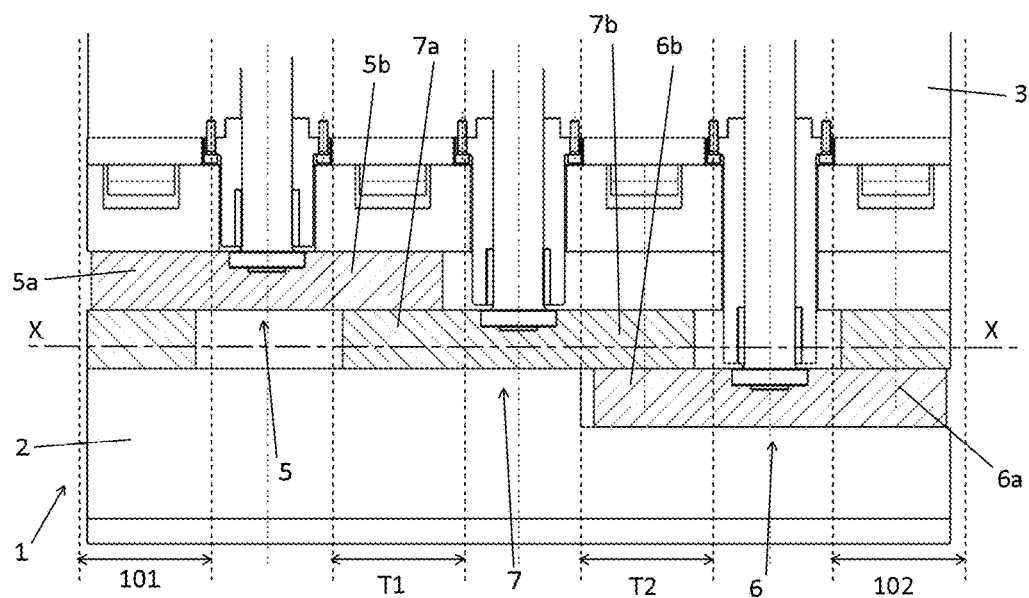
Figure 3:
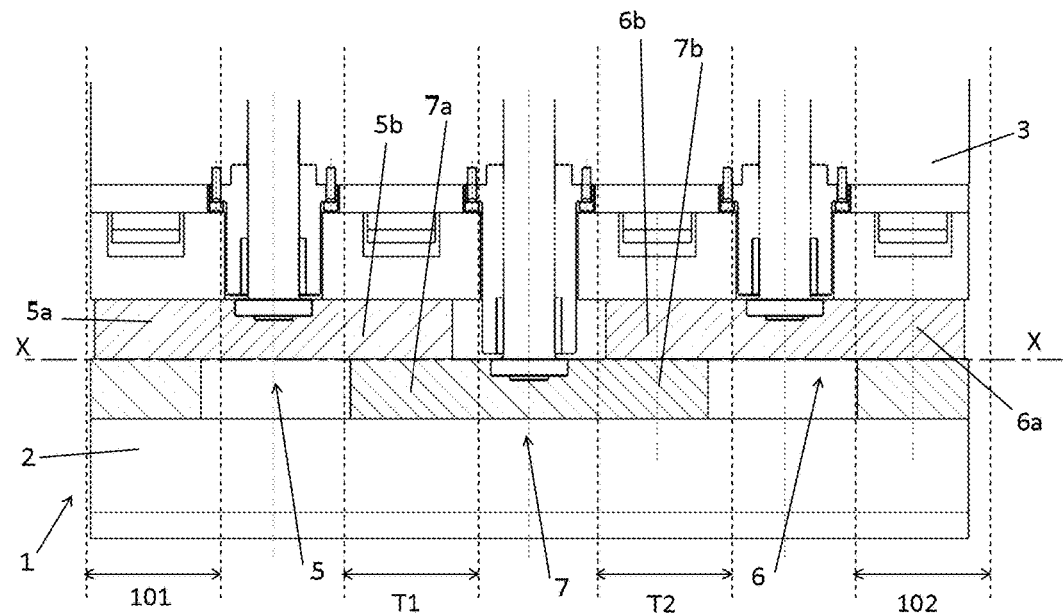
Figure 4:
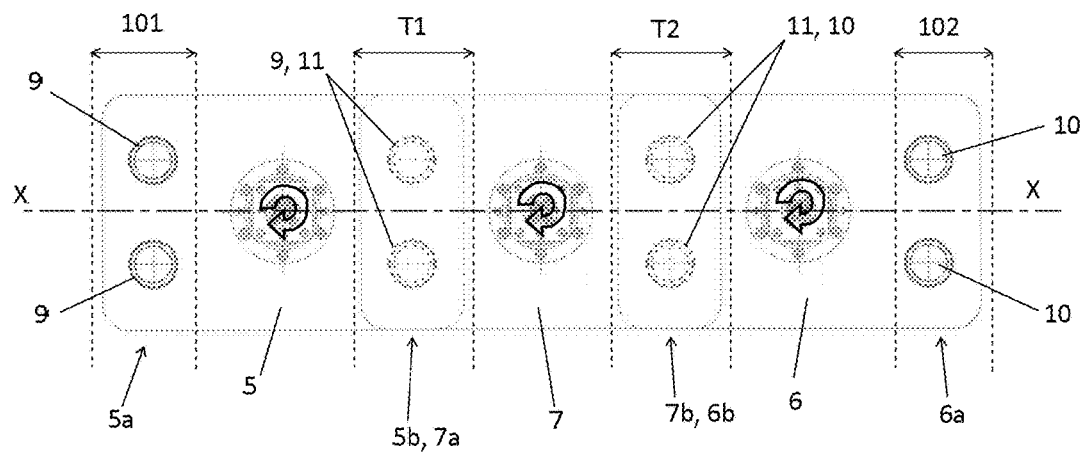
Figure 7:
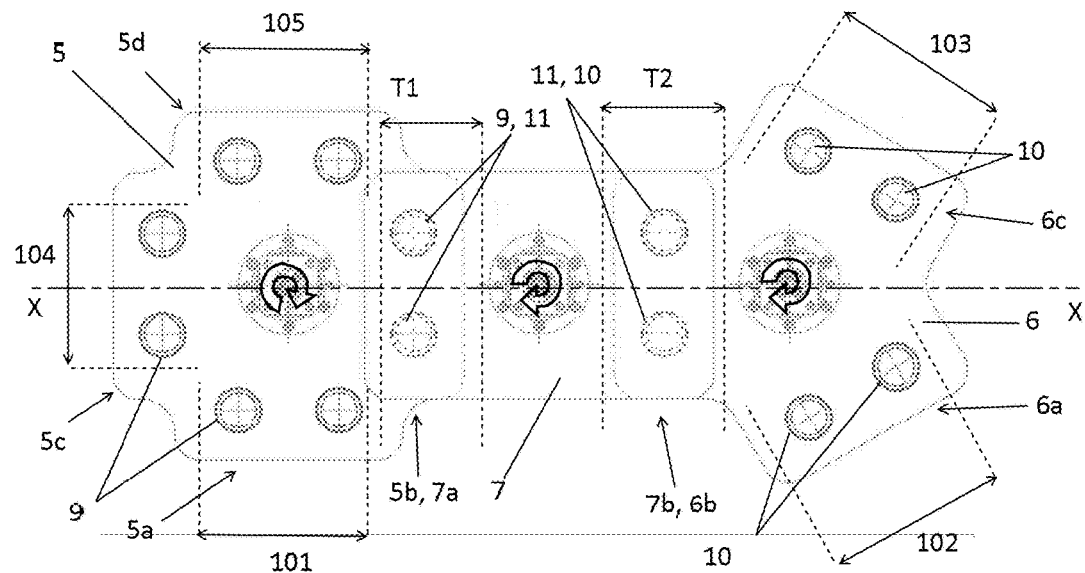
Figure 8:
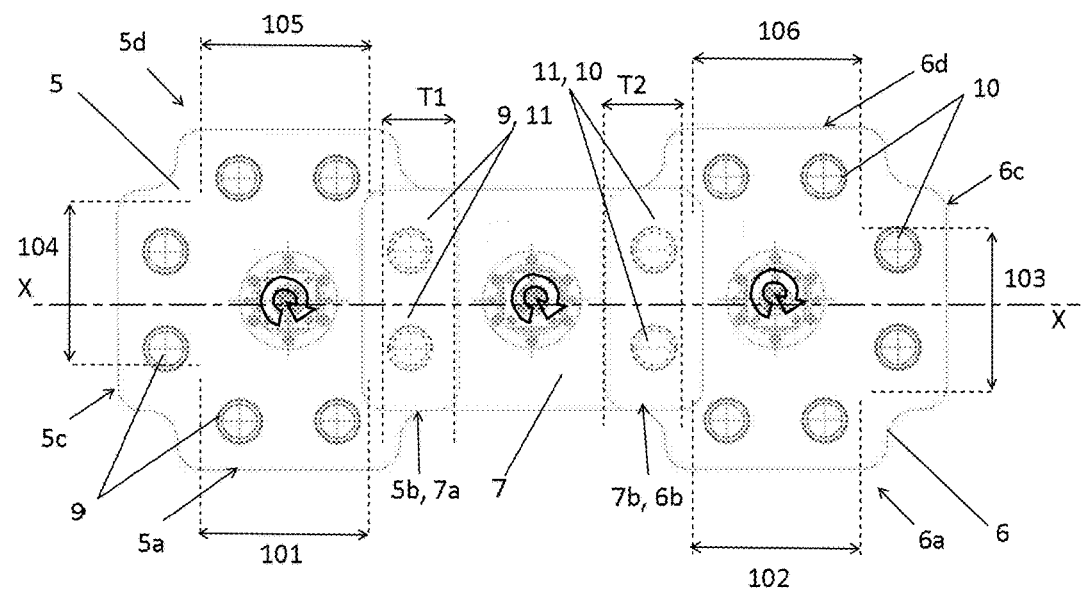
Figure 9:
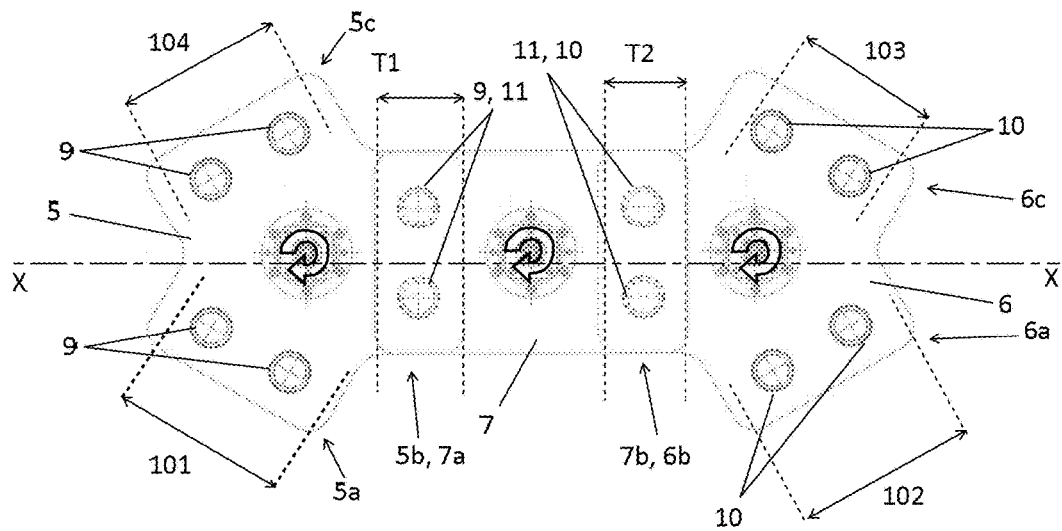
Figure 10:
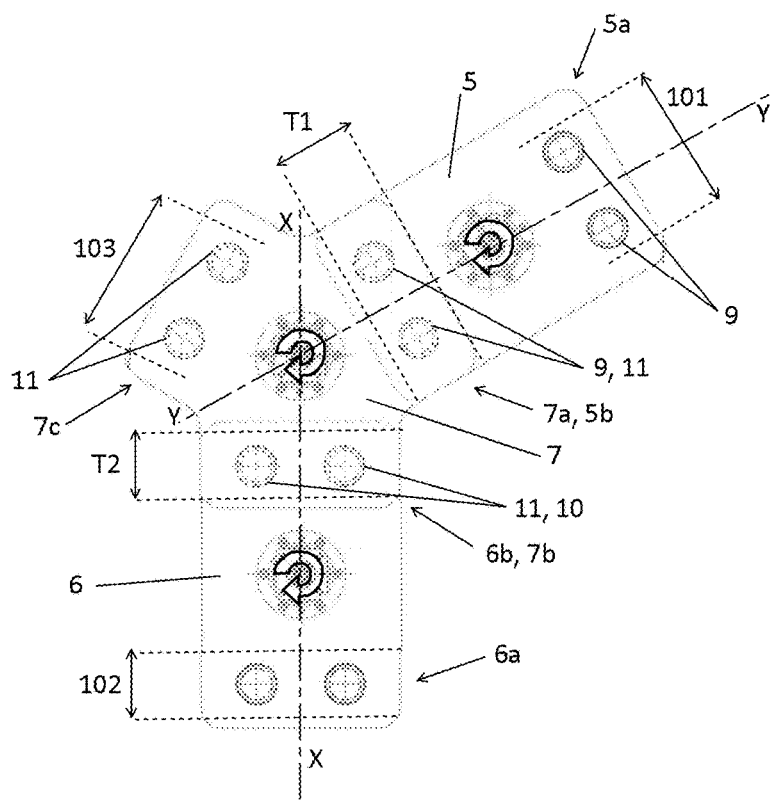
Figure 11:
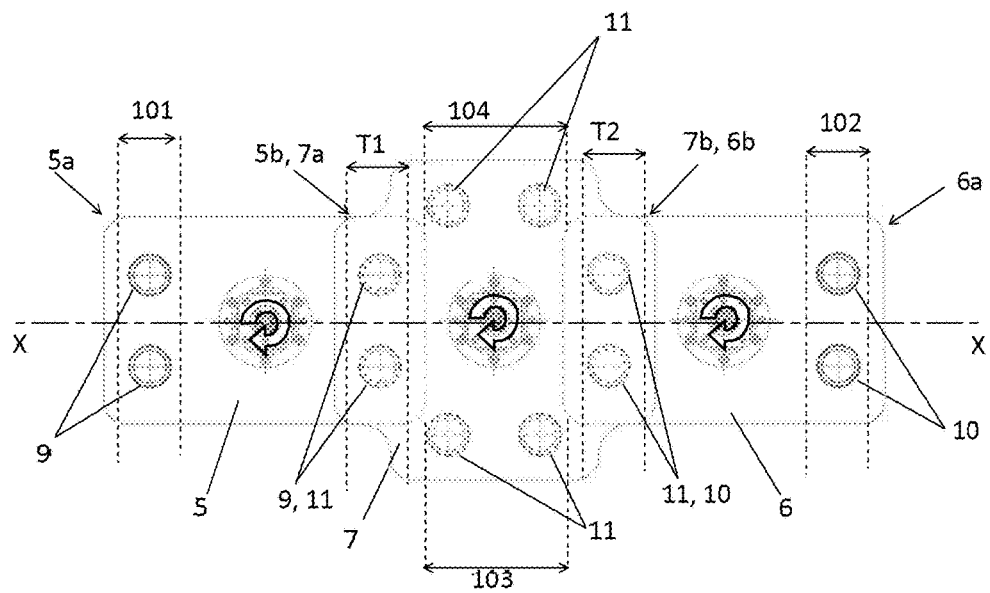
Figure 12:
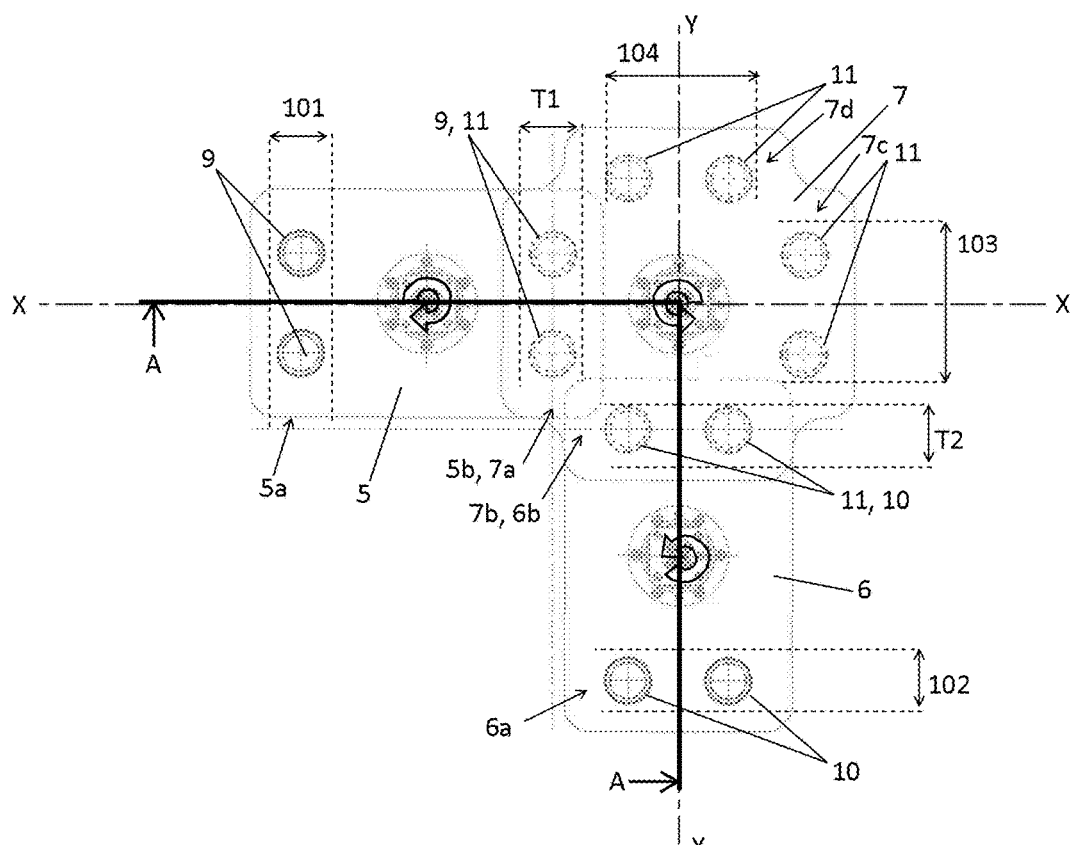
Figure 13:
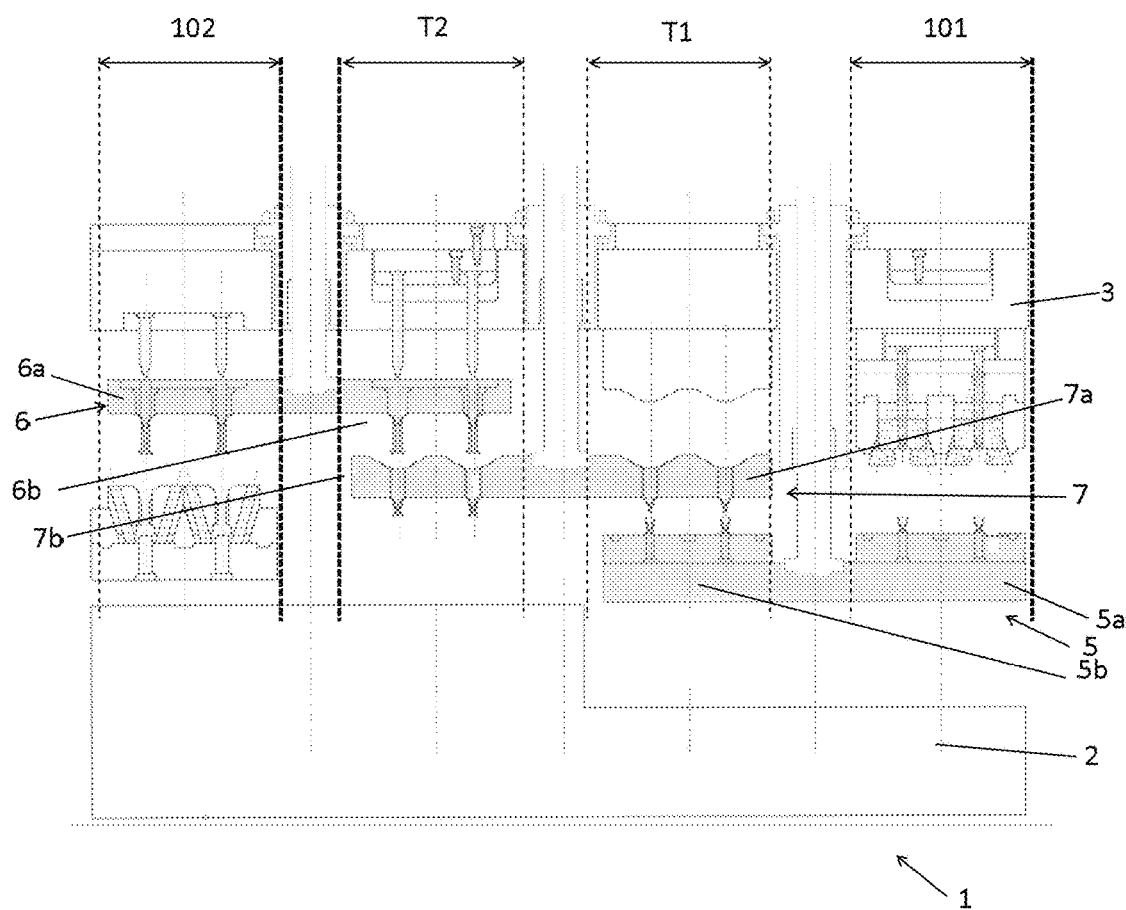

The invention will be better understood, thanks to the description hereinafter, which relates to embodiments according to the present invention, given as non-limiting examples and explained with reference to the appended schematic drawings, in which:

FIG. 1 is a partial sectional view of the injection mold according to the invention in which the loaders are arranged in a first configuration, FIG. 2 is a partial sectional view of the injection mold according to the invention in which the loaders are arranged in a second configuration, FIG. 3 is a partial sectional view of the injection mold according to the invention in which the loaders are arranged in a third configuration, FIG. 4 is a top view of the loaders of the injection mold according to the invention according to a first embodiment, FIG. 5 is a top view of the loaders of the injection mold according to the invention according to a first variant of the first embodiment, FIG. 6 is a top view of the loaders of the injection mold according to the invention according to a third variant of the first embodiment, FIG. 7 is a top view of the loaders of the injection mold according to the invention according to a fifth variant of the first embodiment, FIG. 8 is a top view of the loaders of the injection mold according to the invention according to a seventh variant of the first embodiment, FIG. 9 is a top view of the loaders of the injection mold according to the invention according to a ninth variant of the first embodiment, FIG. 10 is a top view of the loaders of the injection mold according to the invention according to a second embodiment, FIG. 11 is a top view of the loaders of the injection mold according to the invention according to a third embodiment, FIG. 12 is a top view of the loaders of the injection mold according to the invention according to a ninth variant of the third embodiment, FIG. 13 is a partial sectional view according to the axis A-A of the injection mold according to the invention according to the ninth variant of the third embodiment represented in FIG. 12.

In the following description of the injection mold 1 according to the invention, said injection mold 1 may be used in a horizontal position or in a vertical position.

Regardless of the embodiment of the injection mold 1 and regardless of the configuration of the loaders 5, 6, 7 of the injection mold 1 according to the invention, the injection mold 1 comprises a first mold portion 2 and a second mold portion 3. Referring to FIGS. 1 to 3 and 13, the first mold portion 2 of the injection mold 1 is positioned facing the second mold portion 3. According to the invention, the first mold portion 2 may be fixed or movable axially relative to the second mold portion 3. Alternatively or complementarily, the second mold portion 3 may be fixed or movable axially relative to the first mold portion 2. The axial displacement of the first mold portion 2 and/or of the second mold portion 3 is carried out at least between an opening position and a closure position of the injection mold 1.

The injection mold 1 comprises at least two stations at which an injection of a portion of the part is carried out.

The injection mold 1 comprises a first rotary loader 5 including a first portion 5a presenting at least one first molding cavity 9 positioned at the level of a first injection station 101. The first loader 5 is configured to be displaced at least in rotation between the first injection station and a first transfer and/or assembly area T1. Thus, at each rotation, the first portion 5a of the first loader 5 changes position. Preferably, the first loader 5 is movable in translation. The first loader 5 is positioned between the first mold portion 2 and the second mold portion 3 as visible in FIGS. 1 to 3 and 13.

In addition, the injection mold 1 also comprises a second rotary loader 6 including a first portion 6a presenting at least one first molding cavity 10 positioned at the level of a second injection station. The second loader 6 is configured to be displaced at least in rotation between the second injection station and a second transfer and/or assembly area T2. Thus, at each rotation, the first portion 6a of the second loader 6 changes position. Preferably, the second loader 6 is movable in translation. The second loader 6 is positioned between the first mold portion 2 and the second mold portion 3 as visible in FIGS. 1 to 3 and 13.

Furthermore, the injection mold 1 comprises at least one transfer loader 7 movable at least in rotation configured to transfer a portion of the part injected in the molding cavity 9 of the first loader 5 or in the molding cavity 10 of the second loader 6, respectively on the second loader 6 or on the first loader 5.

The transfer loader 7 comprises at least one transfer cavity 11 adapted to pair with the molding cavities of the first loader and of the second loader 6 in order to transfer the portions of the parts from one loader to another.

The transfer loader 7 is configured to be displaced at least in rotation between the first transfer and/or assembly area T1 and the second transfer and/or assembly area T2, and preferably both in rotation and in translation. The transfer loader 7 is positioned between the first mold portion 2 and the second mold portion 3 as visible in FIGS. 1 to 3 and 13.

In a first configuration of the loaders 5, 6, 7 of the injection mold 1 according to the invention represented in FIG. 1, the first loader 5, the second loader 6 and the transfer loader 7 are movably mounted on the second mold portion 3. Of course, in this first configuration, it is also possible that one of the loaders 5, 6, 7 or several loaders 5, 6, 7 could be movably mounted on the first mold portion 2 without departing from the scope of the invention.

In the first configuration illustrated in FIG. 1, the transfer loader 7 presents a first loader portion 7a in the first transfer and/or assembly area T1 and a second loader portion 7b in the second transfer and/or assembly area T2. The first portion 7a of the transfer loader 7 is positioned facing a second portion 5b of the first loader 5 in the first transfer and/or assembly area T1 and the second loader portion 7b is positioned facing a second portion 6b of the second loader 6 in the second transfer and/or assembly area T2. Of course, when the transfer loader 7 performs a rotation, the first loader portion 7a is set in the second transfer and/or assembly area T2 and the second loader portion 7b is set in the first transfer and/or assembly area T1. Thus, at each rotation, the first and second loader portions 7a, 7b change position.

In a horizontal position of the injection mold 1, the transfer loader 7 is arranged above the first and second loaders 5, 6.

In a vertical position of the injection mold 1, the transfer loader 7 is arranged the closest to the second mold portion 3 in comparison with the first and second loaders 5, 6 and set back with respect to the longitudinal axis X-X of the injection mold 1 in the direction of the second mold portion 3.

In a second configuration of the loaders 5, 6, 7 of the injection mold 1 according to the invention represented in FIG. 2, the first loader 5, the second loader 6 and the transfer loader 7 are movably mounted on the second mold portion 3. Of course, in this second configuration, it is also possible that one of the loaders 5, 6, 7 or several loaders 5, 6, 7 could be movably mounted on the first mold portion 2 without departing from the scope of the invention.

In the second configuration illustrated in FIG. 2, the transfer loader 7 presents a first loader portion 7a in the first transfer and/or assembly area T1 and a second loader portion 7b in the second transfer and/or assembly area T2. The first portion 7a of the transfer loader 7 is positioned facing a second portion 5b of the first loader 5 in the first transfer and/or assembly area T1 and the second loader portion 7b is positioned facing a second portion 6b of the second loader 6 in the second transfer and/or assembly area T2. Of course, when the transfer loader 7 performs a rotation, the first loader portion 7a is set in the second transfer and/or assembly area T2 and the second loader portion 7b is set in the first transfer and/or assembly area T1. Thus, at each rotation, the first and second loader portions 7a, 7b change position.

In a horizontal position of the injection mold 1, the transfer loader 7 is arranged between the first loader 5 and the second loader 6 with respect to the longitudinal axis X-X of the injection mold 1. More particularly, the second portion 5b of the first loader 5 is positioned above the first loader portion 7a and the second portion 6b of the second loader 6 is positioned below the second loader portion 7b.

In a vertical position of the injection mold 1, the first loader 5 is arranged le closest to the second mold portion 3 in comparison with the transfer loader 7 and with the second loader 6 and the second loader 6 is arranged the closest to the first mold portion 2 in comparison with the first loader 5 and with the transfer loader 7, said transfer loader being positioned between the first loader 5 and the second loader 6. More particularly, the first loader 5 is positioned back set with respect to the longitudinal axis X-X of the injection mold 1 in the direction of the second mold portion 3 and the second loader 6 is positioned back set with respect to the longitudinal axis X-X of the injection mold 1 in the direction of the first mold portion 2.

In a third configuration of the loaders 5, 6, 7 of the injection mold 1 according to the invention represented in FIG. 3, the first loader 5, the second loader 6 and the transfer loader 7 are movably mounted on the second mold portion 3. Of course, in this third configuration, it is also possible that one of the loaders 5, 6, 7 or several loaders 5, 6, 7 could be movably mounted on the first mold portion 2 without departing from the scope of the invention.

In the third configuration illustrated in FIG. 3, the transfer loader 7 presents a first loader portion 7a in the first transfer and/or assembly area T1 and a second loader portion 7b in the second transfer and/or assembly area T2. The first portion 7a of the transfer loader 7 is positioned facing a second portion 5b of the first loader 5 in the first transfer and/or assembly area T1 and the second loader portion 7b is positioned facing a second portion 6b of the second loader 6 in the second transfer and/or assembly area T2. Of course, when the transfer loader 7 performs a rotation, the first loader portion 7a is set in the second transfer and/or assembly area T2 and the second loader portion 7b is set in the first transfer and/or assembly area T1. Thus, at each rotation, the first and second loader portions 7a, 7b change position.

In a horizontal position of the injection mold 1, the transfer loader 7 is arranged below the first and second loaders 5, 6.

In a vertical position of the injection mold 1, the transfer loader 7 is arranged the closest to the first mold portion 2 in comparison with the first and second loaders 5, 6 and set back with respect to the longitudinal axis X-X of the injection mold 1 in the direction of the first mold portion 2.

Each configuration developed hereinafter can apply to any embodiment, variant and alternative described hereinafter.

For more clarity, regardless of the embodiment, the variant of the embodiment or the alternative, all the injection methods described hereinafter cover a production cycle of only one part. Of course, during the described production cycle of the part, other production cycles of other parts are carried out simultaneously and in the same injection mold 1 according to the invention.

The first embodiment of the injection mold 1 will now be described with reference to FIG. 4.

In the first embodiment, the injection mold comprises a first station 101, a first transfer and/or assembly area T1, a second station 102 and a second transfer and/or assembly area T2. In the first embodiment, the first station 101 and the second station 102 are stations intended for injecting portions of the part.

Furthermore, the first loader 5 includes a first portion 5a and a second portion 5b opposite to the first portion 5a. Each portion 5a, 5b of the first loader 5 presents at least one molding cavity 9.

The first loader 5 is configured to be displaced at least in rotation between the first station 101 and the first transfer and/or assembly area T1. Thus, at each rotation, the first and second portions 5a, 5b of the first loader 5 change position and pass from the first station 101 to the first transfer and/or assembly area T1.

Furthermore, the second loader 6 includes a first portion 6a and a second portion 6b opposite to the first portion 6a. Each portion 6a, 6b of the second loader 6 presents at least one molding cavity 10.

The second loader 6 is configured to be displaced at least in rotation between the second station 102 and the second transfer and/or assembly area T2. Thus, at each rotation, the first and second portions 6a, 6b of the second loader 6 change position and pass from the second station 102 to the second transfer and/or assembly area T2.

Moreover, the transfer loader 7 comprises a first loader portion 7a and a second loader portion 7b opposite to the first loader portion 7a. Each portion 7a, 7b of the transfer loader 7 presents at least one transfer cavity 11.

The transfer loader 7 is configured to be displaced at least in rotation between the first transfer and/or assembly area T1 and the second transfer and/or assembly area T2.

In the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled and then ejected at the second transfer and/or assembly area T2 for example by a lateral ejection arm.

Alternatively, when the first portion of the part is at the level of the first transfer and/or assembly area T1 and the second portion of the part is at the level of the second transfer and/or assembly area T2, the transfer loader 7 recovers the second portion of the part in a transfer cavity 11 and performs a rotation so that the transfer cavity 11 in which is positioned the second portion of the part, faces, at the level of the first transfer and/or assembly area T1, the molding cavity 9 of the first loader 5 in which is positioned the first portion of the part.

Afterwards, the first portion of the part and the second portion of the part are assembled and then ejected at the first transfer and/or assembly area T1 for example by a lateral ejection arm.

A first variant of the first embodiment of the injection mold 1 will now be described with reference to FIG. 5.

The first variant of the first embodiment differs from the first embodiment in that:
 the second loader 6 comprises a third portion 6c,
 the injection mold 1 comprises a third station 103.

The rest of the features of the injection mold 1, the first and second loaders 5, 6 and the transfer loader 7 remain the same.

In the first variant of the first embodiment, the first station 101 is an injection station of a first portion of the part, the second station 102 is an injection station of a second portion of the part and the third station 103 is an ejection station.

In the first variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the first variant of the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled at the second transfer and/or assembly area T2 in the molding cavity 10 of the first portion 6a of the second loader 6.

Finally, the second loader 6 performs a rotation so that the first portion 6a of the second loader 6, carrying the completed part, resulting from the assembly of the first and second portions of the part, is positioned at the level of the third station in order to eject the completed part.

A non-represented second variant of the first embodiment of the injection mold 1 will now be described.

The second variant of the first embodiment differs from the first embodiment in that:
 the first loader 5 comprises a third portion 5c, the injection mold 1 comprises a third station 103.

The rest of the features of the injection mold 1, the first and second loaders 5, 6 and the transfer loader 7 remain the same.

In the second variant of the first embodiment, the first station 101 is an injection station of a second portion of the part, the second station 102 is an injection station of a second portion of the part and the third station 103 is an ejection station.

In the second variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the second variant of the first embodiment, we proceed as described hereinafter.

A first portion of the part is injected at the second station 102 in a molding cavity 9 of the first portion 5a of the first loader 5, a second portion of the part is injected, simultaneously or in a slightly deferred manner, in a molding cavity 10 of the first portion 6a of the second loader 6 at the first station 101.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

The transfer loader 7 then recovers the second portion of the part in a transfer cavity 11 at the level of the second transfer and/or assembly area T2.

Afterwards, the transfer loader 7 performs a rotation so that the transfer cavity 11, in which is positioned the second portion of the part, faces, at the level of the first transfer and/or assembly area T1, the molding cavity 9 of the first portion 5a of the first loader 5 in which is positioned the first portion of the part.

Afterwards, the first portion of the part and the second portion of the part are assembled at the first transfer and/or assembly area T1 in the molding cavity 9 of the first portion 5a of the first loader 5.

Finally, the first loader 5 performs a rotation so that the first portion 5a of the first loader 5, carrying the completed part, resulting from the assembly of the first and second portions of the part, is positioned at the level of the third station 103 in order to eject the completed part.

A third variant of the first embodiment of the injection mold 1 will now be described with reference to FIG. 6.

The third variant of the first embodiment differs from the first embodiment in that:
the second loader 6 comprises a third portion 6c and a fourth portion 6d,
the injection mold 1 comprises a third station 103 and a fourth station 104.

The rest of the features of the injection mold 1, the first and second loaders 5, 6 and the transfer loader 7 remain the same.

In the third variant of the first embodiment, the first station 101 is an injection station of a first portion of the part, the second station 102 is an injection station of a second portion of the part, the third station 103 is an ejection station and the fourth station 104 is a cooling station, a heating station, an insert posing station, a snap-fitting station, a mirror welding station, an overmolded-bead welding station, an ornament posing station, a laser marking station or an injection station of another material.

In the third variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the third variant of the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled at the second transfer and/or assembly area T2 in the molding cavity 10 of the first portion 6a of the second loader 6.

Then, the second loader 6 performs a rotation so that the first portion 6a, carrying the assembled part, resulting from the assembly of the first and second portions of the part, is positioned at the level of the fourth station 104.

Afterwards, at the fourth station 104, one of the following treatments is carried out, for example: cooling or heating or posing of an insert or snap-fitting or mirror welding or overmolded-bead welding or posing of an ornament or laser marking or injection of another material on the assembled part.

Finally, the second loader 6 performs a new rotation so that the first portion 6a of the second loader 6, carrying the completed part, corresponding to the assembled and then treated part, is positioned at the level of the third station 103 in order to eject the completed part.

In a first alternative of the third variant of the first embodiment which is not represented, the first station 101 is an injection station of a first portion of the part, the second station 102 is a cooling station, a heating station, an insert posing station, a snap-fitting station, a mirror welding station, an overmolded-bead welding station, an ornament posing station, a laser marking station or an injection station of another material, the third station 103 is an injection station of a second portion of the part and the fourth station 104 is an ejection station.

Thus, in this first alternative, the treatment consisting in cooling or heating or posing of an insert or snap-fitting or mirror welding or overmolded-bead welding or posing of an ornament or laser marking or injection of another material, which will be called the complementary treatment in the following description of the present application, is carried out after the injection of the second portion of the part and before the assembly of the second portion of the part with the first portion of the part in the second transfer and/or assembly area T2. In this first alternative, the complementary treatment may, for example, consist of posing of an insert, an injection of a first material, cooling, laser marking, etc.

In a non-represented second alternative of the third variant of the first embodiment, the first station 101 is an injection station of the first portion of the part, the second station 102 is an injection station, the third station 103 is a cooling station, a heating station, an insert posing station, a snap-fitting station, a mirror welding station, an overmolded-bead welding station, an ornament posing station, a laser marking station or an injection station of another material; and the fourth station 104 is an ejection station.

Thus, in this second alternative, the complementary treatment carried out at the third station 103 is carried out before the injection at the second station 102 and after the assembly of the second portion of the part at the second transfer and/or assembly area T2. In this second alternative, the complementary treatment may, for example, consist of posing of an insert, an injection of a first material.

A non-represented fourth variant of the first embodiment of the injection mold 1 will now be described.

The fourth variant of the first embodiment differs from the first embodiment in that:
 the first loader 5 comprises a third portion 5c and a fourth portion 5d,
 the injection mold 1 comprises a third station 103 and a fourth station 104.

The rest of the features of the injection mold 1, the first and second loaders 5, 6 and the transfer loader 7 remain the same.

In the fourth variant of the first embodiment, the first station 101 is an injection station of a second portion of the part, the second station 102 is an ejection station, the third station 103 is an injection station of a first portion of the part and the fourth station 104 is a cooling station, a heating station, an insert posing station, a snap-fitting station, a mirror welding station, an overmolded-bead welding station, an ornament posing station, a laser marking station or an injection station of another material.

In the fourth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the fourth variant of the first embodiment, we proceed as described hereinafter.

A first portion of the part is injected at the third station 103 in a molding cavity 9 of the first portion 5a of the first loader 5, a second portion of the part is injected, simultaneously or in a slightly deferred manner, in a molding cavity 10 of the first portion 6a of the second loader 6 at the first injection station 101.

Then, the first loader 5 performs a rotation so that the first portion 5a of the first loader 5, carrying the injected first portion of the part, is positioned at the level of the fourth station 104. A complementary treatment is then carried out on the injected first portion of the part at the fourth station 104.

The second loader 6 performs a rotation so that the first portion 6a of the second loader 6, carrying the injected second portion of the part, is positioned at the level of the second transfer and/or assembly area T2.

The first loader 5 performs a rotation so that the first portion 5a of the first loader 5, carrying the injected and treated first portion of the part, is positioned at the level of the first transfer and/or assembly area T1.

The transfer loader 7 then recovers the second portion of the part in a transfer cavity 11 at the level of the second transfer and/or assembly area T2.

Afterwards, the transfer loader 7 performs a rotation so that the transfer cavity 11, in which is positioned the second portion of the part, faces, at the level of the first transfer and/or assembly area T1, the molding cavity 9 of the first portion 5a of the first loader 5 in which is positioned the first portion of the part.

Afterwards, the first portion of the part and the second portion of the part are assembled at the first transfer and/or assembly area T1 in the molding cavity 9 of the first portion 5a of the first loader 5.

Finally, the first loader 5 performs a rotation so that the first portion 5a of the first loader 5, carrying the completed part, resulting from the assembly of the first and second portions of the part, is positioned at the level of the second station 102 in order to eject the completed part.

The first and second alternatives described for the third variant of the first embodiment can apply to the fourth variant described hereinbefore.

A fifth variant of the first embodiment of the injection mold 1 will now be described with reference to FIG. 7.

The fifth variant of the first embodiment differs from the first embodiment in that:
 the first loader 5 comprises a third portion 5c and a fourth portion 5d,
 the second loader 6 comprises a third portion 6c,
 the injection mold 1 comprises a third station 103, a fourth station 104 and a fifth station 105.

The rest of the features of the injection mold 1, the first and second loaders 5, 6 and the transfer loader 7 remain the same.

In the first variant of the first embodiment, the first station 101 is an injection station of a first portion of the part, the second station 102 is an injection station of a second portion of the part, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material and the fifth station 105 is a cooling station, a heating station, an insert posing station, a snap-fitting station, a mirror welding station, an overmolded-bead welding station, an ornament posing station, a laser marking station or an injection station of another material.

In the fifth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the fifth variant of the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 performs a rotation so that the first portion 5a of the first loader 5, carrying the injected first portion of the part, is positioned at the level of the fourth station 104.

The complementary treatment is carried out on the injected first portion of the part at the fourth station 104, for example a laser marking, an overmolding with another material, etc.

Then, the first loader 5 performs a rotation so that the first portion 5a of the first loader 5, carrying the injected first portion of the part, is positioned at the level of the fifth station 105.

The second complementary treatment is carried out on the injected and treated first portion of the part at the fifth station 105, for example a laser marking, an overmolding with another material, etc.

It is to be noted that according to the invention, the first complementary treatment carried out at the fourth station 104 may be identical to or different from the second complementary treatment carried out at the fifth station 105.

Then, the first loader 5 performs a rotation so that the first portion 5a of the first loader 5, carrying the injected and treated first portion of the part, is positioned at the level of the first transfer and/or assembly area T1.

The second loader 6 performs a rotation so that the first portion 6a of the second loader 6, carrying the injected second portion of the part, is positioned at the level of the second transfer and/or assembly area T2, the rotation of the second loader 6 may be operated during or in a deferred manner with one of the previously described steps.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled at the second transfer and/or assembly area T2.

Finally, the second loader 6 performs a rotation so that the first portion 6a of the second loader 6, carrying the completed part, resulting from the assembly of the first and second portions of the part, is positioned at the level of the third station 103 in order to eject the completed part.

According to a first alternative of the fifth variant, the first station 101 is a cooling station, a heating station, an insert posing station, a snap-fitting station, a mirror welding station, an overmolded-bead welding station, an ornament posing station, a laser marking station or an injection station of another material; the fourth station 104 is an injection station of a first portion of the part, the fifth station 105 is a cooling station, a heating station, an insert posing station, a snap-fitting station, a mirror welding station, an overmolded-bead welding station, an ornament posing station, a laser marking station or an injection station of another material, the second station 102 is an injection station of a second portion of the part and the third station 103 is an ejection station.

Thus, in this first alternative, a first complementary treatment is carried out before the injection of the first portion of the part and a second complementary treatment is carried out after the injection of the first portion of the part and before the transfer of said first portion of the part on the transfer loader 7. In this first alternative, the first complementary treatment may, for example, consist of posing of an insert, and the second complementary treatment may, for example, consist of an injection of a second material.

According to a second alternative of the fifth variant, the first station 101 is an ejection station, the second station 102 is a cooling station, a heating station, an insert posing station, a snap-fitting station, a mirror welding station, an overmolded-bead welding station, an ornament posing station, a laser marking station or an injection station of another material, the third station 103 is an injection station of a second portion of the part, the fourth station 104 is a cooling station, a heating station, an insert posing station, a snap-fitting station, a mirror welding station, an overmolded-bead welding station, an ornament posing station, a laser marking station or an injection station of another material and the fifth station 105 is an injection station of a first portion of the part.

Thus, according to this second alternative, a first complementary treatment is carried out before the injection of the second portion of the part and a second complementary treatment is carried out before the injection of the first portion of the part. The first and the second complementary treatments may be different or identical.

Furthermore, according to this second alternative, the second portion of the part which is transferred on the transfer loader 7 is assembled with the first portion of the part at the first transfer and/or assembly area T1 in the molding cavity 9 of the first portion 5a of the first loader 5. Finally, the first loader 5 performs a rotation so that the first portion 5a of the first loader 5, carrying the completed part, resulting from the assembly of the first and second portions of the part, is positioned at the level of the third station 103 in order to eject the completed part.

According to a third alternative of the fifth variant, the first station 101 is an ejection station, the second station 102 is a cooling station, a heating station, an insert posing station, a snap-fitting station, a mirror welding station, an overmolded-bead welding station, an ornament posing station, a laser marking station or an injection station of another material, the third station 103 is an injection station of a second portion of the part, the fourth station 104 is an injection station of a first portion of the part and the fifth station 105 is a cooling station, a heating station, an insert posing station, a snap-fitting station, a mirror welding station, an overmolded-bead welding station, an ornament posing station, a laser marking station or an injection station of another material.

Thus, in this third alternative, a first complementary treatment is carried out before the injection of the second portion of the part and a second complementary treatment is carried out after the injection of the first portion of the part and before the assembly of the first portion of the part with the second portion of the part. The first and the second complementary treatments may be different or identical. The rest of the method remains the same as the second alternative.

According to a fourth alternative of the fifth variant, the first station 101 is an ejection station, the second station 102 is an injection station of a second portion of the part, the third station 103 is a cooling station, a heating station, an insert posing station, a snap-fitting station, a mirror welding station, an overmolded-bead welding station, an ornament posing station, a laser marking station or an injection station of another material, the fourth station 104 is an injection station of a first portion of the part and the fifth station 105 is a cooling station, a heating station, an insert posing station, a snap-fitting station, a mirror welding station, an overmolded-bead welding station, an ornament posing station, a laser marking station or an injection station of another material.

Thus, in this fourth alternative, a first complementary treatment is carried out after the injection of the second portion of the part and before the transfer of the second portion of the part; and a second complementary treatment is carried out after the injection of the first portion of the part and before the assembly of the first portion of the part with the second portion of the part. The first and the second complementary treatments may be different or identical. The rest of the method remains the same as the second and third alternatives.

According to a fifth alternative of the fifth variant, the first station 101 is an ejection station, the second station 102 is an injection station of a second portion of the part, the third station 103 is a cooling station, a heating station, an insert posing station, a snap-fitting station, a mirror welding station, an overmolded-bead welding station, an ornament posing station, a laser marking station or an injection station of another material, the fourth station 104 is a cooling station, a heating station, an insert posing station, a snap-fitting station, a mirror welding station, an overmolded-bead welding station, an ornament posing station, a laser marking station or an injection station of another material and the fifth station 105 is an injection station of a first portion of the part.

Thus, in this fourth alternative, a first complementary treatment is carried out after the injection of the second portion of the part and before the transfer of the second portion of the part; and a second complementary treatment is carried out before the injection of the first portion of the part. The first and the second complementary treatments may be different or identical. The rest of the method remains the same as the second and third alternatives.

A non-represented sixth variant of the first embodiment of the injection mold 1 will now be described.

The sixth variant of the first embodiment differs from the first embodiment in that:
the first loader 5 comprises a third portion 5c,
the second loader 6 comprises a third portion 6c and a fourth portion 6d,
the injection mold comprises a third station 103, a fourth station 104, and a fifth station 105.

The rest of the features of the injection mold 1, the first and second loaders 5, 6 and the transfer loader 7 remain the same.

In the sixth variant of the first embodiment, the second station 102 is an injection station of a first portion of the part, the first station 101 is a cooling station, a heating station, an insert posing station, a snap-fitting station, a mirror welding station, an overmolded-bead welding station, an ornament posing station, a laser marking station or an injection station of another material, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material and the fifth station 105 is an injection station of a second portion of the part.

In the sixth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the sixth variant of the first embodiment, we proceed as described hereinafter.

A first portion of the part is injected at the second station 102 in a molding cavity 9 of the first portion 5a of the first loader 5, a second portion of the part is injected, simultaneously or in a slightly deferred manner, in a molding cavity 10 of the first portion 6a of the second loader 6 at the fifth station 105.

Then, the second loader 6 performs a rotation so that the first portion 6a of the second loader 6, carrying the injected second portion of the part, is positioned at the level of the fourth station 104. A first complementary treatment is then carried out at the fourth station 104 on the injected second portion of the part for example a laser marking, an overmolding with another material, etc.

Then, the second loader 6 performs a new rotation so that the first portion 6a of the second loader 6, carrying the injected and treated second portion of the part, is positioned at the level of the first station 101. A second complementary treatment is then carried out on the injected and treated second portion of the part for example a laser marking, posing of an insert, etc.

It is to be noted that according to the invention, the first complementary treatment carried out at the fourth station 104 may be identical to or different from the second complementary treatment carried out at the fifth station 105.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

In order to reach respectively the first transfer and/or assembly area T1 and the second transfer and/or assembly area T2, the rotation of the first loader 5 and the rotation of the second loader 6 may be carried out in a staggered manner, for example the rotation of the first loader 5 is performed during one of the complementary treatments of the second portion of the part; or carried out simultaneously.

The transfer loader 7 then recovers the second portion of the part in a transfer cavity 11 at the level of the second transfer and/or assembly area T2.

Afterwards, the transfer loader 7 performs a rotation so that the transfer cavity 11, in which is positioned the second portion of the part, faces, at the level of the first transfer and/or assembly area T1, the molding cavity 9 of the first portion 5a of the first loader 5 in which is positioned the first portion of the part.

Afterwards, the first portion of the part and the second portion of the part are assembled at the first transfer and/or assembly area T1 in the molding cavity 9 of the first portion 5a of the first loader 5.

Finally, the first loader 5 performs a rotation so that the first portion 5a of the first loader 5, carrying the completed part, resulting from the assembly of the first and second portions of the part, is positioned at the level of the third station 103 in order to eject the completed part.

In a first alternative of the sixth variant, the second station 102 is an injection station of a first portion of the part, the first station 101 is a cooling station, a heating station, an insert posing station, a snap-fitting station, a mirror welding station, an overmolded-bead welding station, an ornament posing station, a laser marking station or an injection station of another material, the third station 103 is an ejection station, the fourth station 104 is an injection station of a second portion of the part and the fifth station 105 is a cooling station, a heating station, an insert posing station, a snap-fitting station, a mirror welding station, an overmolded-bead welding station, an ornament posing station, a laser marking station or an injection station of another material.

Thus, in this first alternative, a first complementary treatment is carried out before the injection of the second portion of the part and a second complementary treatment is carried out after the injection of the second portion of the part and before the transfer of the second portion of the part at the level of the second transfer and/or assembly area T2. The first and the second complementary treatments may be different or identical. The rest of the method remains the same as the sixth variant.

In a second alternative of the sixth variant, the second station 102 is an injection station of a first portion of the part, the first station 101 is an injection station of a second portion of the part, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material and the fifth station 105 is a cooling station, a heating station, an insert posing station, a snap-fitting station, a mirror welding station, an overmolded-bead welding station, an ornament posing station, a laser marking station or an injection station of another material.

Thus, in this first alternative, a first complementary treatment and a second complementary treatment are carried out before the injection of the second portion of the part. The first and the second complementary treatments may be different or identical. The rest of the method remains the same as the sixth variant.

In a third alternative of the sixth variant, the first station 101 is a cooling station, a heating station, an insert posing station, a snap-fitting station, a mirror welding station, an overmolded-bead welding station, an ornament posing station, a laser marking station or an injection station of another material, the second station is an injection station of a first portion of the part, the third station 103 is a cooling station, a heating station, an insert posing station, a snap-fitting station, a mirror welding station, an overmolded-bead welding station, an ornament posing station, a laser marking station or an injection station of another material, the fourth station 104 is an injection station of a second portion of the part and the fifth station 105 is an ejection station.

In order to form a part by an injection method implemented by the injection mold 1 according to the third alternative of the sixth variant of the first embodiment, we proceed as described hereinafter.

A first complementary treatment is carried out prior to the injection in a molding cavity 9 of the first portion 5a of the first loader 5 at the third station 103. At the same time, a second portion of the part is injected, simultaneously or in a slightly deferred manner, in a molding cavity 10 of the first portion 6a of the second loader 6 at the fourth injection station 104.

Then, the first loader 5 performs a rotation so that the first portion 5a of the first loader 5 is positioned at the level of the second station 102. A first portion of the part is then injected at the second station 102 in a molding cavity 9 of the first portion 5a of the first loader 5.

At the same time, the second loader 6 performs a rotation so that the first portion 6a of the second loader 6, carrying the injected second portion of the part, is positioned at the level of the first station 101. The rotation of the first loader 5 and the rotation of the second loader 6 may be carried out in a staggered manner or simultaneously. Afterwards, a complementary treatment is carried out on the injected second portion of the part at the first station 101. The injection of the first portion of the part may be carried out at the same time as the complementary treatment is carried out on the second portion of the part.

Then, the first loader 5 and the second loader 6 perform a rotation, simultaneously or in a staggered manner, so that the first portion 5a of the first loader 5, carrying the injected first portion of the part, is positioned at the level of the first transfer and/or assembly area T1 and the first portion 6a of the second loader 6, carrying the injected second portion of the part, is positioned at the level of the second transfer and/or assembly area T2.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled at the second transfer and/or assembly area T2 in the molding cavity 10 of the first portion 6a of the second loader 6.

Finally, the second loader 6 performs a rotation so that the first portion 6a of the second loader 6, carrying the completed part, resulting from the assembly of the first and second portions of the part, is positioned at the level of the fifth station 105 in order to eject the completed part.

In a fourth alternative of the sixth variant, the first station 101 is an injection station of a second portion of the part, the second station 102 is an injection station of a first portion of the part, the third station 103 is a cooling station, a heating station, an insert posing station, a snap-fitting station, a mirror welding station, an overmolded-bead welding station, an ornament posing station, a laser marking station or an injection station of another material, the fourth station 104 is a cooling station, a heating station, an insert posing station, a snap-fitting station, a mirror welding station, an overmolded-bead welding station, an ornament posing station, a laser marking station or an injection station of another material, and the fifth station 105 is an ejection station.

Thus, in this fourth alternative, a first complementary treatment is carried out before the injection of the first portion of the part and a second complementary treatment is carried out before the injection of the second portion of the part, the ejection of the completed part being carried out directly after the assembly of the first portion of the part with the second portion of the part at the second transfer and/or assembly area T2. The rest of the method remains the same as the third alternative.

In a fifth alternative of the sixth variant, the first station 101 is an injection station of a second portion of the part, the second station 102 is an injection station of a first portion of the part, the third station 103 is a cooling station, a heating station, an insert posing station, a snap-fitting station, a mirror welding station, an overmolded-bead welding station, an ornament posing station, a laser marking station or an injection station of another material, the fourth station 104 is an ejection station, and the fifth station 105 is a cooling station, a heating station, an insert posing station, a snap-fitting station, a mirror welding station, an overmolded-bead welding station, an ornament posing station, a laser marking station or an injection station of another material.

Thus, in this fifth alternative, a first complementary treatment is carried out before the injection of the first portion of the part and a second complementary treatment is carried out after the assembly of the first portion of the part with the second portion of the part at the second transfer and/or assembly area T2 and before the ejection at the fourth station 104. The rest of the method remains the same as the third alternative.

In other alternatives similar to the third, fourth and fifth alternatives, the second station 102 is a cooling station, a heating station, an insert posing station, a snap-fitting station, a mirror welding station, an overmolded-bead welding station, an ornament posing station, a laser marking station or an injection station of another material and the third station is an injection station of a first material.

A seventh variant of the first embodiment of the injection mold 1 will now be described with reference to FIG. 8.

The seventh variant of the first embodiment differs from the first embodiment in that:
- the first loader 5 comprises a third portion 5c and a fourth portion 5d,
- the second loader 6 comprises a third portion 6c and a fourth portion 6d,
- the injection mold 1 comprises a third station 103, a fourth station 104, a fifth station 105 and a sixth station 106.

The rest of the features of the injection mold 1, the first and second loaders 5, 6 and the transfer loader 7 remain the same.

In the seventh variant of the first embodiment, the first station 101 is an injection station of a first portion of the part, the second station 102 is an injection station of a second portion of the part, the third station 103 is an ejection station, the fourth station 104 and the fifth station 105 and the sixth station 106 are cooling stations, heating stations, insert posing stations, snap-fitting stations, mirror welding stations, overmolded-bead welding stations, ornament posing stations, laser marking stations or injection stations of another material.

In the seventh variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the seventh variant of the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 performs a rotation so that the first portion 5a of the first loader 5, carrying the injected first portion of the part, is positioned at the level of the fourth station 104. A first complementary treatment is then carried out on the injected first portion of the part at the fourth station 104, for example a laser marking, an injection of another material, etc.

Afterwards, the first loader 5 performs a second rotation so that the first portion 5a of the first loader 5, carrying the injected and treated first portion of the part, is positioned at the level of the fifth station 105. A second complementary treatment is carried out on the injected and treated first portion of the part, for example posing of an insert, a laser marking, an injection of another material, etc. The first complementary treatment and the second complementary treatment may or may not be of the same nature.

Then, the first loader 5 performs a new rotation so that the first portion 5a of the first loader 5, carrying the injected and treated first portion of the part, is positioned in the first transfer and/or assembly area T1. The second loader 6 performs a rotation so that the first portion 6a of the second loader 6, carrying the injected second portion of the part, is positioned at the level of the second transfer and/or assembly area T2, the rotation of the second loader 6 may be operated during or in a differed manner with one of the previously described steps.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the second portion of the part and the first portion of the part are assembled at the second transfer and/or assembly area T2.

Then, the second loader 6 recovers the assembled part, resulting from the assembly of the first and second portions of the part, in the molding cavity 10, and performs a rotation so that said molding cavity 10 containing the assembled part is set at the level of the sixth station 106. A third complementary treatment is carried out on the assembled part at the sixth station 106.

Finally, the second loader 6 performs a rotation so that the completed part positioned in the molding cavity 10 of the second loader 6 is set at the level of the ejection station 103 in order to be ejected.

In a first alternative of the seventh variant of the first embodiment, the first station 101 is a cooling station, a heating station, an insert posing station, a snap-fitting station, a mirror welding station, an overmolded-bead welding station, an ornament posing station, a laser marking station or an injection station of another material, the second station 102 is an injection station of a second portion of the part, the third station 103 is an ejection station, the fourth station 104 is an injection station of a first portion of the part, the fifth station 105 and the sixth station 106 are cooling stations, heating stations, insert posing stations, snap-fitting stations, mirror welding stations, overmolded-bead welding stations, ornament posing stations, laser marking stations or injection stations of another material.

Thus, in this first alternative, a first complementary treatment is carried out before the injection of the first portion of the part, a second complementary treatment is carried out after the injection of the first portion of the part, and a third complementary treatment is carried out after the assembly of the first portion of the part and of the second portion of the part in the second transfer and/or assembly area T2. The first, second and third complementary treatments may be different or identical. The rest of the method remains the same as the seventh variant.

In a second alternative of the seventh variant of the first embodiment, the first station 101 is a cooling station, a heating station, an insert posing station, a snap-fitting station, a mirror welding station, an overmolded-bead welding station, an ornament posing station, a laser marking station or an injection station of another material, the second station 102 is an injection station of a second portion of the part, the third station 103 is an ejection station, the fifth station 105 is an injection station of a first portion of the part, the fourth station 104 and the sixth station 106 are cooling stations, heating stations, insert posing stations, snap-fitting stations, mirror welding stations, overmolded-bead welding stations, ornament posing stations, laser marking stations or injection stations of another material.

Thus, in this second alternative, a first and a second complementary treatments are carried out before the injection of the first portion of the part, and a third complementary treatment is carried out after the assembly of the first portion of the part and of the second portion of the part in the second transfer and/or assembly area T2. The first, second and third complementary treatments may be different or identical. The rest of the method remains the same as the seventh variant.

In a third alternative of the seventh variant of the first embodiment, the first station 101 is an injection station of a first portion of the part, the second station 102 is a cooling station, a heating station, an insert posing station, a snap-fitting station, a mirror welding station, an overmolded-bead welding station, an ornament posing station, a laser marking station or an injection station of another material, the third station 103 is an injection station of a second portion of the part, the sixth station 106 is an ejection station, the fourth station 104 and the fifth station 105 are cooling stations, heating stations, insert posing stations, snap-fitting stations, mirror welding stations, overmolded-bead welding stations, ornament posing stations, laser marking stations or injection stations of another material.

Thus, in this third alternative, a first and a second complementary treatments are carried out after the injection of the first portion of the part, and a third complementary treatment is carried out after the injection of the second portion of the part and before the assembly of the first portion of the part and of the second portion of the part in the second transfer and/or assembly area T2. The first, second and third complementary treatments may be different or identical. The rest of the method remains the same as the seventh variant.

In a fourth alternative of the seventh variant of the first embodiment, the first station 101 is an injection station of a first portion of the part, the second station 102 is an injection station of a second portion of the part, the third station 103 is a cooling station, a heating station, an insert posing station, a snap-fitting station, a mirror welding station, an overmolded-bead welding station, an ornament posing station, a laser marking station or an injection station of another material, the sixth station 106 is an ejection station, the fourth station 104 and the fifth station 105 are cooling stations, heating stations, insert posing stations, snap-fitting stations, mirror welding stations, overmolded-bead welding stations, ornament posing stations, laser marking stations or injection stations of another material.

Thus, in this fourth alternative, a first and a second complementary treatments are carried out after the injection of the first portion of the part, and a third complementary treatment is carried out before the injection of the second portion of the part and before the assembly of the first portion of the part and of the second portion of the part in the second transfer and/or assembly area T2. The first, second and third complementary treatments may be different or identical. The rest of the method remains the same as the seventh variant.

According to the invention, other alternatives are possible in particular by combining the first alternative or the second alternative respectively with the third or the fourth alternative or vice versa.

A non-represented eighth variant of the first embodiment of the injection mold 1 will now be described.

The eighth variant of the first embodiment differs from the first embodiment in that:

the first loader 5 comprises a third portion 5c and a fourth portion 5d,
the second loader 6 comprises a third portion 6c and a fourth portion 6d,
the injection mold 1 comprises a third station 103, a fourth station 104, a fifth station 105 and a sixth station 106.

The rest of the features of the injection mold 1, the first and second loaders 5, 6 and the transfer loader 7 remain the same.

In the eighth variant of the first embodiment, the first station 101 is an injection station of a second portion of the part, the second station 102 is a cooling station, a heating station, an insert posing station, a snap-fitting station, a mirror welding station, an overmolded-bead welding station, an ornament posing station, a laser marking station or an injection station of another material, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material, the fifth station 105 is a cooling station, a heating station, an insert posing station, a snap-fitting station, a mirror welding station, an overmolded-bead welding station, an ornament posing station, a laser marking station or an injection station of another material, and the sixth station 106 is an injection station of a first portion of the part.

In the eighth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the eighth variant of the first embodiment, we proceed as described hereinafter.

A first portion of the part is injected at the sixth station 106 in a molding cavity 9 of the first portion 5a of the first loader 5.

At the same time, at the fifth station 105, a first complementary treatment is carried out prior to the injection of the second portion of the part, the complementary treatment being carried out in a molding cavity 10 of the first portion 6a of the second loader 6.

Then, the second loader 6 performs a rotation so that the first portion 6a of the second loader 6 is positioned at the level of the fourth station 104. At the same time, the first loader 5 performs a rotation so that the first portion 5a of the first loader 5, carrying the injected first portion of the part, is positioned at the level of the first transfer and/or assembly area T1.

The injection of the first portion of the part may be performed simultaneously or in a staggered manner with the first complementary treatment. Similarly, the rotations of the first and second loaders 5, 6 may be carried out simultaneously or in a staggered manner.

Afterwards, a second complementary treatment is carried out prior to the injection of the second portion of the part, the second complementary treatment being carried out on the first complementary treatment, for example an overmolding of a first material on a posed insert.

Then, the second loader 6 performs a new rotation so that the first portion 6a of the second loader 6 is positioned at the level of the first station 101. A second portion of the part is then injected in the molding cavity 10 of the first portion 6a of the second loader 6.

Then, the second loader 6 performs a rotation so that the first portion 6a of the second loader 6, carrying the injected second portion of the part, is positioned at the level of the second transfer and/or assembly area T2.

The transfer loader 7 then recovers the second portion of the part in a transfer cavity 11 at the level of the second transfer and/or assembly area T2.

Afterwards, the transfer loader 7 performs a rotation so that the transfer cavity 11, in which is positioned the second portion of the part, faces, at the level of the first transfer and/or assembly area T1, the molding cavity 9 of the first portion 5a of the first loader 5 in which is positioned the first portion of the part.

Afterwards, the first portion of the part and the second portion of the part are assembled at the first transfer and/or assembly area T1 in the molding cavity 9 of the first portion 5a of the first loader 5.

Then, the first loader 5 performs a rotation so that said molding cavity 9 containing the assembled part, resulting from the assembly of the first and second portions of the part, is set at the level of the second station 102. A third complementary treatment is carried out on the assembled part at the second station 102 for example a laser marking, an injection of another material, etc.

Finally, the first loader 5 performs a rotation so that the completed part positioned in the molding cavity 9 of the first loader 5 is set at the level of the ejection station 103 in order to be ejected.

In a first alternative of the eighth variant, the first station 101 is a cooling station, a heating station, an insert posing station, a snap-fitting station, a mirror welding station, an overmolded-bead welding station, an ornament posing station, a laser marking station or an injection station of another material, the second station 102 is a cooling station, a heating station, an insert posing station, a snap-fitting station, a mirror welding station, an overmolded-bead welding station, an ornament posing station, a laser marking station or an injection station of another material, the third station 103 is an ejection station, the fourth station 104 is an injection station of a second portion of the part, the fifth station 105 is a cooling station, a heating station, an insert posing station, a snap-fitting station, a mirror welding station, an overmolded-bead welding station, an ornament posing station, a laser marking station or an injection station of another material, and the sixth station 106 is an injection station of a first portion of the part.

Thus, in this first alternative, a first complementary treatment is carried out before the injection of the second portion of the part, a second complementary treatment is carried out after the injection of the second portion of the part and a third complementary treatment is carried out after the assembly of the first and of the second portions of the part at the first transfer and/or assembly area T1. The first, the second and the third complementary treatments may be different or identical. The rest of the method remains the same as the eighth variant.

In a second alternative of the eighth variant, the first station 101 is a cooling station, a heating station, an insert posing station, a snap-fitting station, a mirror welding station, an overmolded-bead welding station, an ornament posing station, a laser marking station or an injection station of another material, the second station 102 is a cooling station, a heating station, an insert posing station, a snap-fitting station, a mirror welding station, an overmolded-bead welding station, an ornament posing station, a laser marking station or an injection station of another material, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material, the fifth station 105 is an injection station of a second portion of the part, and the sixth station 106 is an injection station of a first portion of the part.

Thus, in this second alternative, a first complementary treatment and a second complementary treatment are carried out after the injection of the second portion of the part and a third complementary treatment is carried out after the assembly of the first and of the second portions of the part at the first transfer and/or assembly area T1. The first, the second and the third complementary treatments may be different or identical. The rest of the method remains the same as the eighth variant.

In a third alternative of the eighth variant, the first station 101 is an injection station of a second portion of the part, the second station 102 is an ejection station, the third station 103 is an injection station of a first portion of the part, the fourth station 104 is a cooling station, a heating station, an insert posing station, a snap-fitting station, a mirror welding station, an overmolded-bead welding station, an ornament posing station, a laser marking station or an injection station of another material, the fifth station 105 is a cooling station, a heating station, an insert posing station, a snap-fitting station, a mirror welding station, an overmolded-bead welding station, an ornament posing station, a laser marking station or an injection station of another material, and the sixth station 106 is a cooling station, a heating station, an insert posing station, a snap-fitting station, a mirror welding station, an overmolded-bead welding station, an ornament posing station, a laser marking station or an injection station of another material.

Thus, in this third alternative, a first complementary treatment and a second complementary treatment are carried out before the injection of the second portion of the part, and a third complementary treatment is carried out after the injection of the first portion of the part. The first, the second and the third complementary treatments may be different or identical. The rest of the method remains the same as the eighth variant.

In a fourth alternative of the eighth variant, the first station 101 is an injection station of a second portion of the part, the second station 102 is an ejection station, the third station 103 is a cooling station, a heating station, an insert posing station, a snap-fitting station, a mirror welding station, an overmolded-bead welding station, an ornament posing station, a laser marking station or an injection station of another material, the fourth station 104 is a cooling station, a heating station, an insert posing station, a snap-fitting station, a mirror welding station, an overmolded-bead welding station, an ornament posing station, a laser marking station or an injection station of another material, the fifth station 105 is a cooling station, a heating station, an insert posing station, a snap-fitting station, a mirror welding station, an overmolded-bead welding station, an ornament posing station, a laser marking station or an injection station of another material, and the sixth station 106 is an injection station of a first portion of the part.

Thus, in this fourth alternative, a first complementary treatment and a second complementary treatment are carried out before the injection of the second portion of the part, and a third complementary treatment is carried out before the injection of the first portion of the part. The first, the second and the third complementary treatments may be different or identical. The rest of the method remains the same as the eighth variant.

According to the invention, other alternatives are possible in particular by combining the first alternative or the second alternative respectively with the third or the fourth alternative or vice versa.

A ninth variant of the first embodiment of the injection mold 1 will now be described with reference to FIG. 9.

The ninth variant of the first embodiment differs from the first embodiment in that:
the first loader 5 comprises a third portion 5c,
the second loader 6 comprises a third portion 6c,
the injection mold 1 comprises a third station 103 and a fourth station 104.

The rest of the features of the injection mold 1, the first and second loaders 5, 6 and the transfer loader 7 remain the same.

In the ninth variant of the first embodiment, the first station 101 is an injection station of a first portion of the part, the second station 102 is an injection station of a second portion of the part, the third station 103 is an ejection station and the fourth station 104 is a cooling station, a heating station, an insert posing station, a snap-fitting station, a mirror welding station, an overmolded-bead welding station, an ornament posing station, a laser marking station or an injection station of another material.

In the ninth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the ninth variant of the first embodiment, we proceed as described hereinafter.

A first portion of the part is injected at the first station 101 in a molding cavity 9 of the first portion 5a of the first loader 5, a second portion of the part is injected, simultaneously or in a slightly deferred manner, in a molding cavity 10 of the first portion 6a of the second loader 6 at the second injection station 102.

Then, the first loader 5 performs a rotation so that the first portion 5a of the first loader 5, carrying the injected first portion of the part, is positioned at the level of the fourth station 104. A complementary treatment is then carried out on the injected first portion of the part at the fourth station 104.

Afterwards, the first loader 5 and the second loader 6 perform a rotation so that the first portion 5a of the first loader 5, carrying the injected first portion of the part, is positioned at the level of the first transfer and/or assembly area T1 and the first portion 6a of the second loader 6, carrying the injected second portion of the part, is positioned at the level of the second transfer and/or assembly area T2, the rotations of the first and second loaders 5, 6 may be carried out simultaneously or in a deferred manner.

The transfer loader 7 then recovers the first portion of the part in a transfer cavity 11 at the level of the first transfer and/or assembly area T1.

Afterwards, the transfer loader 7 performs a rotation so that the transfer cavity 11, in which is positioned the first portion of the part, faces, at the level of the second transfer and/or assembly area T2, the molding cavity 10 of the first portion 6a of the second loader 6 in which is positioned the second portion of the part.

Afterwards, the first portion of the part and the second portion of the part are assembled at the second transfer and/or assembly area T2 in the molding cavity 10 of the first portion 6a of the second loader 6.

Finally, the second loader 6 performs a rotation so that the first portion 6a of the second loader 6, carrying the completed part, resulting from the assembly of the first and second portions of the part, is positioned at the level of the third station 103 in order to eject the completed part.

In a first alternative of the ninth variant of the first embodiment, the first station 101 is a cooling station, a heating station, an insert posing station, a snap-fitting station, a mirror welding station, an overmolded-bead welding station, an ornament posing station, a laser marking station or an injection station of another material, the second station 102 is an injection station of a second portion of the part, the third station 103 is an ejection station and the fourth station 104 is an injection station of a first portion of the part.

Thus, in this first alternative, a complementary treatment is carried out before the injection of the first portion of the part. The rest of the method remains the same as the ninth variant.

A non-represented tenth variant of the first embodiment will now be described.

The tenth variant of the first embodiment differs from the first embodiment in that:
the first loader 5 comprises a third portion 5c,
the second loader 6 comprises a third portion 6c,
the injection mold 1 comprises a third station 103 and a fourth station 104.

The rest of the features of the injection mold 1, the first and second loaders 5, 6 and the transfer loader 7 remain the same.

In the tenth variant of the first embodiment, the first station 101 is an injection station of a second portion of the part, the second station 102 is an ejection station, the third station 103 is an injection station of a first portion of the part and the fourth station 104 is a cooling station, a heating station, an insert posing station, a snap-fitting station, a mirror welding station, an overmolded-bead welding station, an ornament posing station, a laser marking station or an injection station of another material.

In the tenth variant of the first embodiment, the axes of rotation and translation of the first loader 5, of the second loader 6 and of the transfer loader 7 are aligned along the longitudinal axis X-X of the injection mold 1.

In order to form a part by an injection method implemented by the injection mold 1 according to the tenth variant of the first embodiment, we proceed as described hereinafter.

A first portion of the part is injected in a molding cavity 9 of the first portion 5a of the first loader 5 at the third injection station 103. At the same time, at the fourth station 104, a complementary treatment is carried out prior to the injection of the second portion of the part in the molding cavity 10 of the first portion 6a of the second loader 6.

Then, the first loader 5 performs a rotation so that the first portion 5a of the first loader 5, carrying the injected first portion of the part, is positioned at the level of the first station 101. A second portion of the part is then injected in a molding cavity 10 of the first portion 6a of the second loader 6 at the first station 101.

Afterwards, the first loader 5 and the second loader 6 perform a rotation so that the first portion 5a of the first loader 5, carrying the injected first portion of the part, is positioned at the level of the first transfer and/or assembly area T1 and the first portion 6a of the second loader 6, carrying the injected second portion of the part, is positioned at the level of the second transfer and/or assembly area T2, the rotations of the first and second loaders 5, 6 may be carried out simultaneously or in a deferred manner.

The transfer loader 7 then recovers the second portion of the part in a transfer cavity 11 at the level of the second transfer and/or assembly area T2.

Afterwards, the transfer loader 7 performs a rotation so that the transfer cavity 11, in which is positioned the second portion of the part, faces, at the level of the first transfer and/or assembly area T1, the molding cavity 9 of the first portion 5a of the first loader 5 in which is positioned the first portion of the part.

Afterwards, the first portion of the part and the second portion of the part are assembled at the first transfer and/or assembly area T1 in the molding cavity 9 of the first portion 5a of the first loader 5.

Finally, the first loader 5 performs a rotation so that the first portion 5a of the first loader 5, carrying the completed part, resulting from the assembly of the first and second portions of the part, is positioned at the level of the second station 102 in order to eject the completed part.

In a first alternative of the tenth variant of the first embodiment, the first station 101 is a cooling station, a heating station, an insert posing station, a snap-fitting station, a mirror welding station, an overmolded-bead welding station, an ornament posing station, a laser marking station or an injection station of another material, the second station 102 is an ejection station, the third station 103 is an injection station of a first portion of the part and the fourth station 104 is an injection station of a second portion of the part.

Thus, in this first alternative, a complementary treatment is carried out before the injection of the second portion of the part. The rest of the method remains the same as the tenth variant.

A second embodiment of the injection mold 1 according to the invention will now be described with reference to FIG. 10.

The second embodiment differs from the first embodiment in that:
- the injection mold 1 comprises a third station 103,
- the transfer loader 7 comprises a first loader portion 7a, a second loader portion 7b and a third loader portion 7c, each presenting at least one transfer cavity 11, the transfer loader 7 being configured to be displaced at least in rotation between the first transfer and/or assembly area T1, the second transfer and/or assembly area T2 and the third station 103.

The rest of the features of the injection mold 1 are identical to the first embodiment described before.

Thus, in the second embodiment of the injection mold 1, the first loader 5 includes a first portion 5a presenting at least one first molding cavity 9 and a second portion 5b comprising at least one second molding cavity 9. The first loader 5 is configured to be displaced at least in rotation between the first station 101 and the first transfer and/or assembly area T1. Furthermore, the second loader 6 includes a first portion 6a presenting at least one first molding cavity 10 and a second portion 6b comprising at least one second molding cavity 10. The second loader 6 is configured to be displaced at least in rotation between the second station 102 and the second transfer and/or assembly area T2.

In the second embodiment, the first station 101 is an injection station of a first portion of the part, the second station 102 is an injection station of a second portion of the part and the third station 103 is an ejection station.

In the second embodiment, the axes of rotation and translation of the first loader 5 and of the transfer loader 7 are aligned along the longitudinal axis X-X of the injection mold 1. In addition, the axes of rotation and translation of the second loader 6 and of the transfer loader 7 are aligned along an axis Y-Y secant to the longitudinal axis X-X of the injection mold 1.

In order to form a part by an injection method implemented by the injection mold 1 according to the second embodiment, a first portion of the part is injected at the first station 101 in a molding cavity 9 of the first loader 5, a second portion of the part is injected, simultaneously or in a deferred manner, in a molding cavity 10 of the second loader 6 at the second station 102.

Then, the first loader 5 and the second loader 6 perform a rotation so that the first portion 5a of the first loader 5, carrying the injected first portion of the part, is positioned at the level of the first transfer and/or assembly area T1 and the first portion 6a of the second loader 6, carrying the injected second portion of the part, is positioned at the level of the second transfer and/or assembly area T2, the rotations of the first and second loaders 5, 6 may be carried out simultaneously or in a deferred manner.

The transfer loader 7 recovers the first portion of the part from the first loader 5 in a transfer cavity 11 of the first loader portion 7a of the transfer loader 7 and performs a rotation so that the transfer cavity 11 of the first loader portion 7a of the transfer loader 7 in which is positioned the first portion of the part faces, at the level of the second transfer and/or assembly area T2, the molding cavity 10 of the second loader 6 in which is positioned the second portion of the part. Afterwards, the first portion of the part and the second portion of the part are assembled at the second transfer and/or assembly area T2 in the transfer cavity 11.

Finally, the transfer loader 7 performs a rotation so that the transfer cavity 11 of the first loader portion 7a of the transfer loader 7, in which the assembled part, resulting from the assembly of the first portion of the part and of the second portion of the part, is positioned at the level of the third station 103 in order to be ejected.

Of course, if the direction of rotation of the transfer loader 7 is reversed, the assembly of the first portion of the part and of the second portion of the part is carried out at the first transfer and/or assembly area T1.

In a first alternative of the second embodiment, the third station 103 is an injection station of a third portion of the part, for example.

Thus, in order to form a part by an injection method implemented by the injection mold 1 according to the first alternative of the second embodiment, a first portion of the part is injected at the first station 101 in a molding cavity 9 of the first loader 5, a second portion of the part is injected, simultaneously or in a slightly deferred manner, in a molding cavity 10 of the second loader 6 at the second station 102 and a third portion of the part is injected, simultaneously or in a slightly deferred manner, in a transfer cavity 11 of the transfer loader 7 at the third station 103.

Then, the first loader 5 and the second loader 6 perform a rotation so that the first portion 5a of the first loader 5, carrying the injected first portion of the part, is positioned at the level of the first transfer and/or assembly area T1, and the first portion 6a of the second loader 6, carrying the injected second portion of the part, is positioned at the level of the second transfer and/or assembly area T2.

The transfer loader 7 then performs a rotation so that the transfer cavity 11, in which the third portion of the part injected at the third injection station is arranged, is positioned facing the molding cavity 9 of the first loader 5 in which the first portion of the part is arranged, at the level of the first transfer and/or assembly area T1. The third portion of the part and the first portion of the part are assembled at said first transfer and/or assembly area T1, in the transfer cavity 11.

Then, the transfer loader 7 performs a new rotation so that the transfer cavity 11 containing the preform resulting from the assembly of the third portion of the part and of the first portion of the part, faces the molding cavity 10 of the second loader 6 containing the second portion of the part and is positioned at the level of the second transfer and/or assembly area T2. The preform and the second portion of the part are assembled at said second transfer and/or assembly area T2, in order to form a completed part which will be ejected afterwards by an arm or other ejection device.

The variants of the second embodiment described hereinafter take up the variants described for the second embodiment. Hence, the related features and injection methods will not be developed in detail since the operation of the variants of the first embodiment can be transposed to the variants of the second embodiment in light of the operation of the second embodiment.

Thus, the first variant of the second embodiment differs from the second embodiment in that:
the first loader 5 comprises a third portion 5c,
the injection mold 1 comprises a fourth station 104.

The rest of the features of the injection mold 1, the first and second loaders 5, 6 and the transfer loader 7 remain the same as those of the second embodiment.

In the first variant of the second embodiment, the first station 101 is an injection station of a first portion of the part, the second station 102 is an injection station of a second portion of the part, the third station 103 is an ejection station and the fourth station 104 is a cooling station, a heating station, an insert posing station, a snap-fitting station, a mirror welding station, an overmolded-bead welding station, an ornament posing station, a laser marking station or an injection station of another material.

In order to understand the operation of this first variant, reference should be made to the first variant of the first embodiment illustrated in FIG. 5, in light of the second embodiment illustrated in FIG. 10. Indeed, in these variants, although the loaders are not similar, the injection mold 1 operates substantially in the same manner with the exception of the ejection which is done at the transfer loader 7 for this first variant but forcibly for the applicable alternatives.

Thus, the first loader 5 is movable in rotation between the fourth station 104 at which a complementary treatment is carried out prior to the injection of the first portion of the part, the first station 101 at which the first portion of the part is injected and the first transfer and/or assembly area T1 at which the first portion of the part is transferred on the transfer loader 7. The second loader 6 is movable in rotation between the second station 102 at which the second portion of the part is injected and the second transfer and/or assembly area T2 at which the first portion of the part and the second portion of the part are assembled. The transfer loader 7 is movable in rotation between the first transfer and/or assembly area T1, the second transfer and/or assembly area T2 and the third station 103 at which the completed part is ejected.

The alternative provided for the second embodiment can apply to the first variant and other alternatives are possible in particular by transposing the alternatives provided for the first variant of the first embodiment.

The second variant of the second embodiment differs from the second embodiment in that:
the second loader 6 comprises a third portion 6c,
the injection mold 1 comprises a fourth station 104.

The rest of the features of the injection mold 1, the first and second loaders 5, 6 and the transfer loader 7 remain the same as those of the second embodiment.

In the second variant of the second embodiment, the first station 101 is an injection station of a second portion of the part, the second station 102 is an injection station of a first portion of the part, the third station 103 is an ejection station and the fourth station 104 is a cooling station, a heating station, an insert posing station, a snap-fitting station, a mirror welding station, an overmolded-bead welding station, an ornament posing station, a laser marking station or an injection station of another material.

In order to understand the operation of this second variant, reference should be made to the non-represented second variant of the first embodiment, in light of the second embodiment illustrated in FIG. 10. Indeed, in these variants, although the loaders are not similar, the injection mold 1 operates substantially in the same manner with the exception of the ejection which is done at the transfer loader 7 for this second variant but forcibly for the applicable alternatives.

Thus, the second loader 6 is movable in rotation between the fourth station 104 at which a complementary treatment is carried out prior to the injection of the second portion of the part, the first station 101 at which the second portion of the part is injected and the second transfer and/or assembly area T2 at which the first portion of the part and the second portion of the part are assembled. The first loader 5 is movable in rotation between the second station 102 at which the first portion of the part is injected and the first transfer and/or assembly area T1 at which the first portion of the part is transferred on the transfer loader 7. The transfer loader 7 is movable in rotation between the first transfer and/or assembly area T1, the second transfer and/or assembly area T2 and the third station 103 at which the completed part is ejected.

The alternative provided for the second embodiment can apply to the second variant and other alternatives are possible in particular by transposing the alternatives provided for the second variant of the first embodiment.

The third variant of the second embodiment differs from the second embodiment in that:
the first loader 5 comprises a third portion 5c,
the second loader 6 comprises a third portion 6c,
the injection mold 1 comprises a fourth station 104 and a fifth station 105.

The rest of the features of the injection mold 1, the first and second loaders 5, 6 and the transfer loader 7 remain the same as those of the second embodiment.

In the third variant of the second embodiment, the first station 101 is an injection station of a first portion of the part, the second station 102 is an injection station of a second portion of the part, the third station 103 is an ejection station and the fourth station is a cooling station, a heating station, an insert posing station, a snap-fitting station, a mirror welding station, an overmolded-bead welding station, an ornament posing station, a laser marking station or an injection station of another material.

In order to understand the operation of this third variant, reference should be made to the ninth variant of the first embodiment illustrated in FIG. 9 and to the non-represented tenth variant of the first embodiment, in light of the second embodiment illustrated in FIG. 10. Indeed, in these variants, although the loaders are not similar, the injection mold 1 operates substantially in the same manner with the exception of the ejection which is done at the transfer loader 7 for this third variant but forcibly for the applicable alternatives.

Thus, the first loader 5 is movable in rotation between the fourth station 104 at which a complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the fifth station 105 at which a complementary treatment is carried out prior to the injection of the second portion of the part, the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the second transfer and/or assembly area T2 and the third station 103 at the level of which the completed part is ejected.

The alternative provided for the second embodiment can apply to the third variant and other alternatives are possible in particular by transposing the alternatives provided for the ninth variant of the first embodiment and for the tenth variant of the first embodiment.

The fourth variant of the second embodiment differs from the second embodiment in that:
the first loader 5 comprises a third portion 5c and a fourth portion 5d,
the injection mold 1 comprises a fourth station 104 and a fifth station 105.

The rest of the features of the injection mold 1, the first and second loaders 5, 6 and the transfer loader 7 remain the same as those of the second embodiment.

In the fourth variant of the second embodiment, the first station 101 is an injection station of a first portion of the part, the second station 102 is an injection station of a second portion of the part, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material, the fifth station 105 is a cooling station, a heating station, an insert posing station, a snap-fitting station, a mirror welding station, an over-molded-bead welding station, an ornament posing station, a laser marking station or an injection station of another material.

In order to understand the operation of this fourth variant, reference should be made to the third variant of the first embodiment illustrated in FIG. 5, in light of the second embodiment illustrated in FIG. 10. Indeed, in these variants, although the loaders are not similar, the injection mold 1 operates substantially in the same manner with the exception of the ejection which is done at the transfer loader 7 for this fourth variant but forcibly for the applicable alternatives.

Thus, the first loader 5 is movable in rotation between the fourth station 104 at which a first complementary treatment is carried out prior to the injection of the first portion of the part, the fifth station 105 at which a second complementary station is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the second transfer and/or assembly area T2 and the third station 103 at the level of which the completed part is ejected.

The alternative provided for the second embodiment can apply to the fourth variant and other alternatives are possible in particular by transposing the alternatives provided for the third variant of the first embodiment.

The fifth variant of the second embodiment differs from the second embodiment in that:
the second loader 6 comprises a third portion 6c and a fourth portion 6d,
the injection mold 1 comprises a fourth station 104 and a fifth station 105.

The rest of the features of the injection mold 1, the first and second loaders 5, 6 and the transfer loader 7 remain the same as those of the second embodiment.

In the fifth variant of the second embodiment, the first station 101 is an injection station of a second portion of the part, the second station 102 is an injection station of a first portion of the part, the third station 103 is an ejection station, the fourth station 104 is a cooling station, a heating station, an insert posing station, a snap-fitting station, a mirror welding station, an overmolded-bead welding station, an ornament posing station, a laser marking station or an injection station of another material, the fifth station 105 is a cooling station, a heating station, an insert posing station, a snap-fitting station, a mirror welding station, an over-molded-bead welding station, an ornament posing station, a laser marking station or an injection station of another material.

In order to understand the operation of this fifth variant, reference should be made to the non-represented fourth variant of the first embodiment, in light of the second embodiment illustrated in FIG. 10. Indeed, in these variants, although the loaders are not similar, the injection mold 1 operates substantially in the same manner with the exception of the ejection which is done at the transfer loader 7 for this fifth variant but forcibly for the applicable alternatives.

Thus, the second loader 6 is movable in rotation between the fourth station 104 at which a first complementary treatment is carried out prior to the injection of the second portion of the part, the fifth station 105 at which a second complementary treatment is carried out prior to the injection of the second portion of the part, the first station 101 at which the second portion of the part is injected and the second transfer and/or assembly area T2 at which the first portion of the part and the second portion of the part are assembled.

The first loader 5 is movable in rotation between the second station 102 at which the first portion of the part is injected and the first transfer and/or assembly area T1 at which the first portion of the part is transferred on the transfer loader 7.

The transfer loader 7 is movable in rotation between the first transfer and/or assembly area T1, the second transfer and/or assembly area T2 and the third station 103 at the level of which the completed part is ejected.

The alternative provided for the second embodiment can apply to the fifth variant and other alternatives are possible in particular by transposing the alternatives provided for the fourth variant of the first embodiment.

The sixth variant of the second embodiment differs from the second embodiment in that:
the first loader 5 comprises a third portion 5c and a fourth portion 5d,
the second loader 6 comprises a third portion 6c,
the injection mold 1 comprises a fourth station 104, a fifth station 105 and a sixth station 106.

The rest of the features of the injection mold 1, the first and second loaders 5, 6 and the transfer loader 7 remain the same as those of the second embodiment.

In the sixth variant of the second embodiment, the first station 101 is an injection station of a first portion of the part, the second station 102 is an injection station of a second portion of the part, the third station 103 is an ejection station, the fourth station, the fifth station 105 and the sixth station 106 are cooling stations, heating stations, insert posing stations, snap-fitting stations, mirror welding stations, over-molded-bead welding stations, ornament posing stations, laser marking stations or injection stations of another material.

In order to understand the operation of this sixth variant, reference should be made to the fifth variant of the first embodiment illustrated in FIG. 7, in light of the second embodiment illustrated in FIG. 10. Indeed, in these variants, although the loaders are not similar, the injection mold 1 operates substantially in the same manner with the exception of the ejection which is done at the transfer loader 7 for this fifth variant but forcibly for the applicable alternatives.

Thus, the first loader 5 is movable in rotation between the fourth station 104 at which a first complementary treatment is carried out prior to the injection of the first portion of the part, the fifth station 105 at which a second complementary treatment is carried out prior to the injection of the first portion of the part, and the first station 101 at which the first portion of the part is injected and the first transfer and/or assembly area T1 at which the first portion of the part is transferred on the transfer loader 7.

The second loader 6 is movable in rotation between the sixth station 106 at which a complementary treatment is carried out prior to the injection of the second portion of the part, the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the second transfer and/or assembly area T2 and the third station 103 at the level of which the completed part is ejected.

The alternative provided for the second embodiment can apply to the sixth variant and other alternatives are possible in particular by transposing the alternatives provided for the fifth variant of the first embodiment.

The seventh variant of the second embodiment differs from the second embodiment in that:
the first loader 5 comprises a third portion 5*c*,
the second loader 6 comprises a third portion 6*c* and a fourth portion 6*d*,
the injection mold 1 comprises a fourth station 104, a fifth station 105, a sixth station 106.

The rest of the features of the injection mold 1, the first and second loaders 5, 6 and the transfer loader 7 remain the same as those of the second embodiment.

In the seventh variant of the second embodiment, the first station 101 is an injection station of a second portion of the part, the second station 102 is an injection station of a first portion of the part, the third station 103 is an ejection station, the fourth station, the fifth station 105 and the sixth station 106 are cooling stations, heating stations, insert posing stations, snap-fitting stations, mirror welding stations, over-molded-bead welding stations, ornament posing stations, laser marking stations or injection stations of another material.

Thus, the first loader 5 is movable in rotation between the fourth station 104 at which a first complementary treatment is carried out prior to the injection of the first portion of the part, the fifth station 105 at which a second complementary treatment is carried out prior to the injection of the first portion of the part, and the first station 101 at which the first portion of the part is injected and the first transfer and/or assembly area T1 at which the first portion of the part is transferred on the transfer loader 7.

The second loader 6 is movable in rotation between the sixth station 106 at which a complementary treatment is carried out prior to the injection of the second portion of the part, the second station 102 at which the second portion of the part is injected and the second transfer and/or assembly area T2 at which the first portion of the part and the second portion of the part are assembled. The transfer loader 7 is movable in rotation between the first transfer and/or assembly area T1, the second transfer and/or assembly area T2 and the third station 103 at which the completed part is ejected.

In order to understand the operation of this seventh variant, reference should be made to the non-represented sixth variant of the first embodiment, in light of the second embodiment illustrated in FIG. 10. Indeed, in these variants, although the loaders are not similar, the injection mold 1 operates substantially in the same manner with the exception of the ejection which is done at the transfer loader 7 for this seventh variant but forcibly for the applicable alternatives.

Thus, the second loader 6 is movable in rotation between the fourth station 104 at which a first complementary treatment is carried out prior to the injection of the second portion of the part, the fifth station 105 at which a second complementary treatment is carried out prior to the injection of the second portion of the part, and the first station 101 at which the second portion of the part is injected and the second transfer and/or assembly area T2 at which the first portion of the part and the second portion of the part are assembled.

The first loader 5 is movable in rotation between the sixth station 106 at which a complementary treatment is carried out prior to the injection of the first portion of the part, the second station 102 at which the first portion of the part is injected and the first transfer and/or assembly area T1 at which the first portion of the part is transferred on the transfer loader 7.

The transfer loader 7 is movable in rotation between the first transfer and/or assembly area T1, the second transfer and/or assembly area T2 and the third station 103 at the level of which the completed part is ejected.

The alternative provided for the second embodiment can apply to the seventh variant and other alternatives are possible in particular by transposing the alternatives provided for the sixth variant of the first embodiment.

The eighth variant of the second embodiment differs from the second embodiment in that:
the first loader 5 comprises a third portion 5*c* and a fourth portion 5*d*,
the second loader 6 comprises a third portion 6*c* and a fourth portion 6*d*,
the injection mold 1 comprises a fourth station 104, a fifth station 105, a sixth station 106 and a seventh station 107.

The rest of the features of the injection mold 1, the first and second loaders 5, 6 and the transfer loader 7 remain the same as those of the second embodiment.

In the eighth variant of the second embodiment, the first station 101 is an injection station of a first portion of the part, the second station 102 is an injection station of a second portion of the part, the third station 103 is an ejection station and the fourth 104, the fifth 105, the sixth 106 and the seventh 107 stations are cooling stations, heating stations, insert posing stations, snap-fitting stations, mirror welding stations, overmolded-bead welding stations, ornament posing stations, laser marking stations or injection stations of another material.

In order to understand the operation of this eighth variant, reference should be made to the seventh variant of the first embodiment illustrated in FIG. 7 and to the non-represented eighth variant of the first embodiment, in light of the second embodiment illustrated in FIG. 10. Indeed, in these variants, although the loaders are not similar, the injection mold 1 operates substantially in the same manner with the exception of the ejection which is done at the transfer loader 7 for this eighth variant but forcibly for the applicable alternatives.

Thus, the first loader 5 is movable in rotation between the fourth station 104 at which a first complementary treatment is carried out prior to the injection of the first portion of the part, the fifth station 105 at which a second complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the sixth station 106 at which a first complementary treatment is carried out prior to the injection of the second portion of the part, the seventh station 107 at which a second complementary treatment is carried out prior to the injection of the second portion of the part, the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the second transfer and/or assembly area T2 and the third station 103 at the level of which the completed part is ejected.

The alternative provided for the second embodiment can apply to the eighth variant and other alternatives are possible in particular by transposing the alternatives provided for the seventh variant and for the eighth variant of the first embodiment.

A third embodiment of the injection mold 1 according to the invention will now be described with reference to FIG. 11.

The third embodiment differs from the first embodiment in that:
 the injection mold 1 comprises a third station 103, a fourth station 104,
 the transfer loader 7 comprises a first loader portion 7a, a second loader portion 7b, a third loader portion 7c, and a fourth loader portion 7d, each presenting at least one transfer cavity 11, the transfer loader 7 being configured to be displaced at least in rotation between the first transfer and/or assembly area T1, the second transfer and/or assembly area T2, the third station 103 and the fourth station 104.

The rest of the features of the injection mold 1 are identical to the first embodiment described before.

Thus, in the third embodiment of the injection mold 1, the first loader 5 includes a first portion 5a presenting at least one first molding cavity 9 and a second portion 5b comprising at least one second molding cavity 9. The first loader 5 is configured to be displaced at least in rotation between the first station 101 and the first transfer and/or assembly area T1. Furthermore, the second loader 6 includes a first portion 6a presenting at least one first molding cavity 10 and a second portion 6b comprising at least one second molding cavity 10. The second loader 6 is configured to be displaced at least in rotation between the second station 102 and the second transfer and/or assembly area T2.

In the third embodiment, the first station 101 is an injection station of a first portion of the part, the second station 102 is an injection station of a second portion of the part, the third station 103 is an ejection station and the fourth station 104 is a cooling station, a heating station, an insert posing station, a snap-fitting station, a mirror welding station, an overmolded-bead welding station, an ornament posing station, a laser marking station or an injection station of another material.

In the third embodiment, the axes of rotation and translation of the first loader 5, of the transfer loader 7 and of the second loader 6 are aligned along the longitudinal axis X-X of the injection mold 1.

In order to form a part by an injection method implemented by the injection mold 1 according to the third embodiment, a first portion of the part is injected at the first station 101 in a molding cavity 9 of the first loader 5, a second portion of the part is injected, simultaneously or in a slightly deferred manner, in a molding cavity 10 of the second loader 6 at the second station 102.

Then, the first loader 5 and the second loader 6 perform a rotation so that the first portion 5a of the first loader 5, carrying the injected first portion of the part, is positioned at the level of the first transfer and/or assembly area T1 and the first portion 6a of the second loader 6, carrying the injected second portion of the part, is positioned at the level of the second transfer and/or assembly area T2, the rotations of the first and second loaders 5, 6 may be carried out simultaneously or in a deferred manner.

The transfer loader 7 recovers the first portion of the part from the first loader 5 in a transfer cavity 11 of the first loader portion 7a of the transfer loader 7 and performs a rotation so that the transfer cavity 11 of the first loader portion 7a of the transfer loader 7, in which is positioned the first portion of the part, is positioned at the level of the fourth station 104. A complementary treatment is then carried out on the injected first portion of the part in the transfer cavity 11 at said fourth station 104.

Then, the transfer loader 7 performs a new rotation so that the transfer cavity 11 of the first loader portion 7a of the transfer loader 7 in which is positioned the injected and treated first portion of the part, faces, at the level of the second transfer and/or assembly area T2, the molding cavity 10 of the second loader 6 in which is positioned the second portion of the part. Afterwards, the first portion of the part and the second portion of the part are assembled at the second transfer and/or assembly area T2 in the transfer cavity 11.

Finally, the transfer loader 7 performs a rotation so that the transfer cavity 11 of the first loader portion 7a of the transfer loader 7, in which the assembled part, resulting from the assembly of the first portion of the part and of the second portion of the part, is positioned at the level of the third station 103 in order to be ejected.

Of course, if the direction of rotation of the transfer loader 7 is reversed, the complementary treatment is carried out on the second portion of the part, and the assembly of the first portion of the part and of the second portion of the part is carried out at the first transfer and/or assembly area T1.

The first variant of the third embodiment differs from the third embodiment in that:
 the first loader 5 comprises a third portion 5c,
 the injection mold 1 comprises a fifth station 105.

The rest of the features of the injection mold 1, the first and second loaders 5, 6 and the transfer loader 7 remain the same as those of the third embodiment.

In the first variant of the third embodiment, the first station 101 is an injection station of a first portion of the part, the second station 102 is an injection station of a second portion of the part, the third station 103 is an ejection station and the fourth station 104 and the fifth station 105 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the fifth station 105 at which a first complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at which a second complementary treatment is carried out on the injected, treated and transferred first portion of the part, the second transfer and/or assembly area T2 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The second variant of the third embodiment differs from the third embodiment in that:
the second loader 6 comprises a third portion 6c,
the injection mold 1 comprises a fifth station 105.

The rest of the features of the injection mold 1, the first and second loaders 5, 6 and the transfer loader 7 remain the same as those of the third embodiment.

In the second variant of the third embodiment, the first station 101 is an injection station of a second portion of the part, the second station 102 is an injection station of a first portion of the part, the third station 103 is an ejection station and the fourth station 104 and the fifth station 105 are cooling stations, heating stations, insert posing stations, snap-fitting stations, mirror welding stations, overmolded-bead welding stations, ornament posing stations, laser marking stations or injection stations of another material.

Thus, the second loader 6 is movable in rotation between the fifth station 105 at which a first complementary treatment is carried out prior to the injection of the second portion of the part, the first station 101 at which the second portion of the part is injected and the second transfer and/or assembly area T2 at which the first portion of the part and the second portion of the part are assembled.

The first loader 5 is movable in rotation between the second station 102 at which the first portion of the part is injected and the first transfer and/or assembly area T1 at which the first portion of the part is transferred on the transfer loader 7.

The transfer loader 7 is movable in rotation between the first transfer and/or assembly area T1, the fourth station 104 at which a first complementary treatment is carried out on the injected and transferred first portion of the part, the second transfer and/or assembly area T2 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The third variant of the third embodiment differs from the third embodiment in that:
the first loader 5 comprises a third portion 5c,
the second loader 6 comprises a third portion 6c,
the injection mold 1 comprises a fifth station 105 and a sixth station 106.

The rest of the features of the injection mold 1, the first and second loaders 5, 6 and the transfer loader 7 remain the same as those of the third embodiment.

In the third variant of the third embodiment, the first station 101 is an injection station of a second portion of the part, the second station 102 is an injection station of a first portion of the part, the third station 103 is an ejection station and the fourth station 104, the fifth station 105 and the sixth station 106 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the fifth station 105 at which a first complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the sixth station 106 at which a first complementary treatment is carried out prior to the injection of the second portion of the part, the first station 101 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at which a complementary second treatment is carried out on the injected, treated and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2, the fourth station 104 at which a second complementary treatment is carried out on the injected, treated and transferred second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The fourth variant of the third embodiment differs from the third embodiment in that:
the first loader 5 comprises a third portion 5c and a fourth portion 5d,
the injection mold 1 comprises a fifth station 105 and a sixth station 106.

The rest of the features of the injection mold 1, the first and second loaders 5, 6 and the transfer loader 7 remain the same as those of the third embodiment.

In the fourth variant of the third embodiment, the first station 101 is an injection station of a first portion of the part, the second station 102 is an injection station of a second portion of the part, the third station 103 is an ejection station and the fourth station 104 and the fifth station 105 and the sixth station 106 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the fifth station 105 at which a first complementary treatment is carried out prior to the injection of the first portion of the part, the sixth station 106 at which a second complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at which a third complementary treatment is carried out on the injected, treated and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2 at which the second portion of the part is transferred, the fourth station 104 at which a first complementary treatment is carried out on the injected second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The fifth variant of the third embodiment differs from the third embodiment in that:
the second loader 6 comprises a third portion 6c and a fourth portion 6d,
the injection mold 1 comprises a fifth station 105 and a sixth station 106.

The rest of the features of the injection mold 1, the first and second loaders 5, 6 and the transfer loader 7 remain the same as those of the third embodiment.

In the fifth variant of the third embodiment, the first station 101 is an injection station of a second portion of the part, the second station 102 is an injection station of a first portion of the part, the third station 103 is an ejection station and the fourth station 104 and the fifth station 105 and the sixth station 106 are cooling stations, heating stations, insert posing stations, snap-fitting stations, mirror welding stations, overmolded-bead welding stations, ornament posing stations, laser marking stations or injection stations of another material.

Thus, the second loader 6 is movable in rotation between the fifth station 105 at which a first complementary treatment is carried out prior to the injection of the second portion of the part, the sixth station 106 at which a second complementary treatment is carried out prior to the injection of the second portion of the part, the first station 101 at which the second portion of the part is injected and the second transfer and/or assembly area T2 at which the first portion of the part and the second portion of the part are assembled.

The first loader 5 is movable in rotation between the second station 102 at which the first portion of the part is injected and the first transfer and/or assembly area T1 at which the first portion of the part is transferred on the transfer loader 7.

The transfer loader 7 is movable in rotation between the first transfer and/or assembly area T1, the fourth station 104 at which a first complementary treatment is carried out on the injected and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2 at which the second portion of the part is transferred, the fourth station 104 at which a third complementary treatment is carried out on the injected and treated second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The sixth variant of the third embodiment differs from the third embodiment in that:
the first loader comprises a third portion 5c and a fourth portion 5d,
the second loader 6 comprises a third portion 6c,
the injection mold 1 comprises a fifth station 105 and a sixth station 106 and a seventh station 107.

The rest of the features of the injection mold 1, the first and second loaders 5, 6 and the transfer loader 7 remain the same as those of the third embodiment.

In the sixth variant of the third embodiment, the first station 101 is an injection station of a first portion of the part, the second station 102 is an injection station of a second portion of the part, the third station 103 is an ejection station and the fourth station 104 and the fifth station 105, the sixth station 106 and the seventh station 107 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the fifth station 105 at which a first complementary treatment is carried out prior to the injection of the first portion of the part, the sixth station 106 at which a second complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the seventh station 107 at which a first complementary treatment is carried out prior to the injection of the second portion of the part, the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at which a third complementary treatment is carried out on the injected, treated and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2 at which the second portion of the part is transferred, the fourth station 104 at which a second complementary treatment is carried out on the injected second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The seventh variant of the third embodiment differs from the third embodiment in that:
the first loader 5 comprises a third portion 5c,
the second loader 6 comprises a third portion 6c and a fourth portion 6d,
the injection mold 1 comprises a fifth station 105 and a sixth station 106 and a seventh station 107.

The rest of the features of the injection mold 1, the first and second loaders 5, 6 and the transfer loader 7 remain the same as those of the third embodiment.

In the seventh variant of the third embodiment, the first station 101 is an injection station of a second portion of the part, the second station 102 is an injection station of a first portion of the part, the third station 103 is an ejection station and the fourth station 104 and the fifth station 105, the sixth station 106 and the seventh station 107 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the seventh station 107 at which a first complementary treatment is carried out prior to the injection of the first portion of the part, the second station 102 at which the first portion of the part is injected and the first transfer and/or assembly area T1 at which the first portion of the part is transferred on the transfer loader 7.

The second loader 6 is movable in rotation between the fifth station 105 at which a first complementary treatment is carried out prior to the injection of the second portion of the part, the sixth station 106 at which a second complementary treatment is carried out prior to the injection of the second portion of the part, the first station 101 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at the level of which a second complementary treatment is carried out on the injected, treated and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2 at which the second portion of the part is transferred, the fourth station 104 at which a third complementary treatment is carried out on the injected second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The eighth variant of the third embodiment differs from the third embodiment in that:
the first loader comprises a third portion 5c and a fourth portion 5d,
the second loader 6 comprises a third portion 6c and a fourth portion 6d,
the injection mold 1 comprises a fifth station 105 and a sixth station 106, a seventh station 107 and an eighth station 108.

The rest of the features of the injection mold 1, the first and second loaders 5, 6 and the transfer loader 7 remain the same as those of the third embodiment.

In the eighth variant of the third embodiment, the first station 101 is an injection station of a first portion of the part, the second station 102 is an injection station of a second portion of the part, the third station 103 is an ejection station and the fourth station 104 and the fifth station 105, the sixth station 106, the seventh station 107 and the eighth station 108 are cooling stations, heating stations, insert posing stations, snap-fitting stations, mirror welding stations, overmolded-bead welding stations, ornament posing stations, laser marking stations or injection stations of another material.

Thus, the first loader 5 is movable in rotation between the fifth station 105 at which a first complementary treatment is carried out prior to the injection of the first portion of the part, the sixth station 106 at which a second complementary treatment is carried out prior to the injection of the first portion of the part, the first station 101 at which the first portion of the part is injected and the first transfer and/or assembly area T1 at which the first portion of the part is transferred on the transfer loader 7.

The second loader 6 is movable in rotation between the seventh station 107 at which a first complementary treatment is carried out prior to the injection of the second portion of the part, the eighth station 108 at which a second complementary treatment is carried out prior to the injection of the second portion of the part, the second station 102 at which the second portion of the part is injected and the second transfer and/or assembly area T2 at which the first portion of the part and the second portion of the part are assembled.

The transfer loader 7 is movable in rotation between the first transfer and/or assembly area T1, the fourth station 104 at which a third complementary treatment is carried out on the injected, treated and transferred first portion of the part, the second transfer and/or assembly area T2 at which the first portion of the part and the second portion of the part are assembled so as to form a completed part and the third station 103 at which the completed part is ejected.

Of course, if the direction of rotation of the transfer loader 7 is reversed, the transfer loader 7 is movable in rotation between the second transfer and/or assembly area T2 at which the second portion of the part is transferred, the fourth station 104 at which a third complementary treatment is carried out on the injected second portion of the part, the first transfer and/or assembly area T1 at which the first portion of the part and the second portion of the part are assembled so as to form a completed part and the third station 103 at which the completed part is ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment and second embodiment.

The ninth variant of the third embodiment illustrated in FIGS. 12 and 13, differs from the third embodiment in that the axes of rotation and translation of the first loader 5 and of the transfer loader 7 are aligned along the longitudinal axis X-X of the injection mold 1 and the axes of rotation and translation of the second loader 6 and of the transfer loader 7 are aligned along an axis Y-Y secant, preferably perpendicular, to the longitudinal axis X-X of the injection mold 1 and in that the fourth station 104 is an injection station of a third portion of the part.

The rest of the features of the injection mold 1, the first and second loaders 5, 6 and the transfer loader 7 remain the same as those of the third embodiment.

In the ninth variant of the third embodiment, the first station 101 is an injection station of a first portion of the part, the second station 102 is an injection station of a second portion of the part, the third station 103 is an ejection station and the fourth station 104 is an injection station of a third portion of the part.

Thus, in order to form a part by an injection method implemented by the injection mold 1 according to the ninth variant of the third embodiment, a first portion of the part is injected at the first station 101 in a molding cavity 9 of the first loader 5, a second portion of the part is injected, simultaneously or in a slightly deferred manner, in a molding cavity 10 of the second loader 6 at the second station 102 and a third portion of the part is injected, simultaneously or in a slightly deferred manner, in a transfer cavity 11 of the transfer loader 7 at the fourth station 104.

Then, the first loader 5 and the second loader 6 perform a rotation so that the first portion 5*a* of the first loader 5, carrying the injected first portion of the part, is positioned at the level of the first transfer and/or assembly area T1, and the first portion 6*a* of the second loader 6, carrying the injected second portion of the part, is positioned at the level of the second transfer and/or assembly area T2.

The transfer loader 7 then performs a rotation so that the transfer cavity 11, in which the third portion of the part injected at the injection station is arranged, is positioned facing the molding cavity 9 of the first loader 5 in which the first portion of the part is arranged, at the level of the first transfer and/or assembly area T1. The third portion of the part and the first portion of the part are assembled at said first transfer and/or assembly area T1, in the transfer cavity 11.

Then, the transfer loader 7 performs a new rotation so that the transfer cavity 11 containing the preform resulting from the assembly of the third portion of the part and of the first portion of the part, faces the molding cavity 10 of the second loader 6 containing the second portion of the part and is positioned at the level of the second transfer and/or assembly area T2. The preform and the second portion of the part are assembled at said second transfer and/or assembly area T2, in order to form a completed part.

Then, the transfer loader 7 performs a rotation so that the transfer cavity 11, carrying the completed part, is positioned at the level of the third station 103 in order to be ejected.

Alternatives are possible, in particular by reversing the stations at the level of which the first 5 and second 6 loaders are positioned during their rotation. In order to understand the operation of these alternatives, reference should be made to the alternatives and variants developed for the first embodiment, second embodiment and third embodiment.

Of course, when the loaders comprise four portions, a rotation between two successive stations corresponds to a quarter turn, when the loaders comprise three portions, a rotation between two successive stations corresponds to a third of a turn, when the loaders comprise two portions, a rotation corresponds to half a turn.

Of course, for convenience of understanding of the invention, all the described methods concern only the formation of one single part but the injection mold 1 according to the invention supports the simultaneous formation of several parts each with a staggered production cycle.

Of course, each loader portion may comprise one or several cavities.

Of course, the loaders may comprise more than two portions and are not limited to a maximum of four portions, they may comprise more than four.

Of course, the injection mold 1 according to the invention may comprise as many stations as necessary, the number of workstations is not limited to the examples described hereinbefore.

Of course, the injection mold 1 according to the invention may comprise as many loaders as necessary, the number of loaders is not limited to the examples described hereinbefore.

The invention claimed is:

1. An injection mold comprising:
    at least one first station for the injection of a first portion of the part,
    at least one second station for the injection of a second portion of the part,
    a first loader including at least one first molding cavity, said first loader being movable at least in rotation between the first station and a first transfer and/or assembly area, a second loader including at least one first molding cavity, said second loader being movable at least in rotation between the second station and a second transfer and/or assembly area, wherein the injection mold comprises at least one transfer loader, movable at least in rotation between the first transfer and/or assembly area and the second transfer and/or assembly area, said transfer loader being configured to transfer the first portion of the part from the first loader on the second loader and/or said transfer loader being configured to transfer the second portion of the part from the second loader on the first loader.

2. The injection mold according to claim 1, wherein the transfer loader comprises at least one first transfer cavity shaped so as to pair in the first transfer and/or assembly area with the at least one molding cavity of the first loader so as to transfer the first portion of the part from the first loader on the transfer loader or vice versa.

3. The injection mold according to claim 2, wherein the at least one transfer cavity of the transfer loader is shaped so as to pair in the second transfer and/or assembly area with the at least one molding cavity of the second loader so as to transfer the second portion of the part from the transfer loader on the second loader or vice versa.

4. The injection mold according to claim 1, comprising a first mold portion and a second mold portion opposite to the first mold portion, the first loader, the second loader and the transfer loader being arranged between the first and second mold portions.

5. The injection mold according to claim 4, wherein the transfer loader is arranged set back with respect to the longitudinal axis X-X of the injection mold and with respect to the first loader and to the second loader in the direction of the first mold portion of the injection mold.

6. The injection mold according to claim 1, wherein the transfer loader is arranged set back with respect to the longitudinal axis X-X of the injection mold and with respect to the first loader and to the second loader, in the direction of the second mold portion of the injection mold.

7. The injection mold, wherein the first loader comprises a plurality of molding cavities and/or the second loader comprises a plurality of molding cavities.

8. The injection mold, comprising at least one ejection and/or cooling station and/or at least one heating station and/or at least one insert posing station and/or at least one snap-fitting station and/or at least one mirror welding station and/or at least one overmolded-bead welding station and/or at least one ornament posing station and/or at least one laser marking station.

9. An injection method implemented by an injection mold according to claim 1, said injection method comprising at least the following steps:
    injection of a first portion of the part in a molding cavity of a first portion of the first loader at a first station,
    injection of a second portion of the part in a molding cavity of a first portion of the second loader at a second station,
    rotation of the first loader so that the first portion of the first loader, carrying the injected first portion of the part, is positioned at the level of the first transfer and/or assembly area,
    rotation of the second loader so that the first portion of the second loader, carrying the injected second portion of the part, is positioned at the level of the second transfer and/or assembly area,
    transfer of the first portion of the part in a transfer cavity at the level of the first transfer and/or assembly area or transfer of the second portion of the part in a transfer cavity at the level of the second transfer and/or assembly area
    rotation of the transfer loader so that the transfer cavity in which is positioned the first portion of the part faces, at the level of the second transfer and/or assembly area the molding cavity of the first portion of the second loader in which is positioned the second portion of the part, or so that the transfer cavity in which is positioned the second portion of the part faces, at the level of the first transfer and/or assembly area the molding cavity of the first portion of the first loader in which is positioned the first portion of the part,
    assembly of the first portion of the part with the second portion of the part,
    ejection of the completed part resulting from the assembly of the first portion of the part with the second portion of the part.

10. The injection method, wherein the steps of injection of the first portion of the part and of the second portion of the part are carried out simultaneously and/or the steps of rotation of the first and second loaders are carried out simultaneously.

* * * * *